(12) United States Patent
Langhoff

(10) Patent No.: US 9,919,870 B2
(45) Date of Patent: Mar. 20, 2018

(54) VERTICAL LIFT STORAGE SYSTEM AND A METHOD OF OPERATING A LIFT

(75) Inventor: Tommy Langhoff, Daugård (DK)

(73) Assignee: EFFIMAT STORAGE TECHNOLOGY APS, Odense Sø (DK)

( * ) Notice: Subject to any disclaimer, the term of this patent is extended or adjusted under 35 U.S.C. 154(b) by 361 days.

(21) Appl. No.: 14/233,135

(22) PCT Filed: Jun. 29, 2012

(86) PCT No.: PCT/EP2012/062700
§ 371 (c)(1),
(2), (4) Date: May 22, 2014

(87) PCT Pub. No.: WO2013/004615
PCT Pub. Date: Jan. 10, 2013

(65) Prior Publication Data
US 2014/0301811 A1    Oct. 9, 2014

(30) Foreign Application Priority Data

Jul. 1, 2011 (DK) .................................. 201100493
Feb. 13, 2012 (DK) .................................. 201270070

(51) Int. Cl.
*B65G 1/06* (2006.01)
*B65G 1/04* (2006.01)

(52) U.S. Cl.
CPC ................. *B65G 1/06* (2013.01); *B65G 1/04* (2013.01); *B65G 1/0407* (2013.01); *B65G 1/0478* (2013.01)

(58) Field of Classification Search
CPC ...... B65G 1/0407; B65G 1/0421; B65G 1/06; B65G 1/0435; B65G 49/085;
(Continued)

(56) References Cited

U.S. PATENT DOCUMENTS 3,217,906 A * 11/1965 Crile .................... B65G 49/085
                                                        414/280
3,228,540 A *  1/1966 Crile .................... B65G 49/085
                                                        414/280
(Continued)

FOREIGN PATENT DOCUMENTS

EP         0734974        10/1996
EP         0737631        10/1996
(Continued)

OTHER PUBLICATIONS

International Search Report dated Sep. 17, 2012 for PCT Application No. PCT/EP2012/062700, filed Jun. 29, 2012.
(Continued)

*Primary Examiner* — Glenn F Myers
(74) *Attorney, Agent, or Firm* — Knobbe, Martens, Olson & Bear, LLP

(57) ABSTRACT

There is provided a vertical lift storage system (101), comprising a storage rack (105) configured to store load units and a lift system with an upwardly and downwardly movable carrier structure (108), where the carrier structure (108) is configured to carry multiple load units at respective sections and with first transportation means configured to insert and withdraw respective load units into and from the storage rack. The system is characterized in that the carrier structure is configured with second transportation means to shift load units sideways on the carrier structure between its sections. In some embodiments the first transportation means comprises telescopic arms and the second transportation means comprises rollers. There is also provided a method of operating such a carrier structure in a vertical lift storage system.

27 Claims, 20 Drawing Sheets

(58) Field of Classification Search
CPC ............ B65G 2207/14; B65G 2207/30; B65G 1/0478; G05B 19/00; G05B 19/418; G05B 19/4182; G05B 19/41835; G05B 19/4189; G05B 15/02; G05B 11/00
See application file for complete search history.

(56) References Cited

U.S. PATENT DOCUMENTS

| | | | | |
|---|---|---|---|---|
| 3,492,704 | A * | 2/1970 | Schwellenbach | B28B 11/245 264/DIG. 43 |
| 3,822,766 | A * | 7/1974 | Suter | B65G 1/0407 187/291 |
| 4,016,986 | A * | 4/1977 | Thomas | F26B 25/12 110/177 |
| 4,492,504 | A * | 1/1985 | Hainsworth | B65G 1/0421 414/273 |
| 4,838,749 | A | 6/1989 | Potocjnak | |
| 5,421,685 | A * | 6/1995 | Elmer | B65G 1/0435 294/188 |
| 5,833,427 | A | 11/1998 | Siegler et al. | |
| 8,616,822 | B2 * | 12/2013 | Winkler | A47F 10/00 211/151 |
| 8,920,098 | B2 * | 12/2014 | Hanel | 414/280 |
| 2004/0052620 | A1 | 3/2004 | Schieleit | |
| 2005/0269184 | A1 * | 12/2005 | Enya | B65G 37/02 198/369.2 |
| 2006/0087927 | A1 * | 4/2006 | Sasaki | G11B 15/689 369/30.27 |
| 2009/0255784 | A1 * | 10/2009 | Kuhn | B65G 47/54 198/598 |
| 2010/0307989 | A1 | 12/2010 | Hanel | |
| 2011/0156332 | A1 * | 6/2011 | Kishimoto | B65G 1/0407 269/56 |
| 2012/0186192 | A1 * | 7/2012 | Toebes | B65G 1/04 53/235 |

FOREIGN PATENT DOCUMENTS

| | | |
|---|---|---|
| EP | 1354828 | 10/2003 |
| EP | 1466846 | 10/2004 |
| JP | 59 172306 A | 9/1984 |
| JP | 61 75706 A | 4/1986 |
| JP | EP 0733563 A1 * | 9/1996 ........... B65G 1/0435 |
| WO | WO 03/019425 | 3/2003 |
| WO | WO 2011/020956 | 2/2011 |

OTHER PUBLICATIONS

Written Opinion dated Sep. 17, 2012 for PCT Application No. PCT/EP2012/062700, filed Jun. 29, 2012.
International Preliminary Report on Patentability dated Jan. 7, 2014 for PCT Application No. PCT/EP2012/062700, filed Jun. 29, 2012.
Extended European Search Report dated Sep. 29, 2016 for EP Application No. 16163865.5, filed Jun. 29, 2012.

\* cited by examiner

VERTICAL LIFT STORAGE SYSTEM AND A METHOD OF OPERATING A LIFT

CROSS REFERENCE TO RELATED APPLICATIONS

This application is a U.S. National Phase Application of PCT International Application No. PCT/EP2012/062700, filed on Jun. 29, 2012, designating the United States of America and published in the English language, which claims priority to Danish Application Nos. PA 2011 00493, filed Jul. 1, 2011 and PA 2012 70070, filed Feb. 13, 2012. The disclosures of the above-referenced applications are hereby expressly incorporated by reference in their entireties.

The present invention relates to a vertical lift storage system comprising a storage rack configured to store load units and a lift system with an upwardly and downwardly movable carrier structure. The carrier structure is also denoted a lift or an elevator within the technical area. The carrier structure is configured to carry multiple load units at respective sections and with first transportation means configured to insert and withdraw respective load units into and from the storage rack.

Generally, a load item is known as a tote or a load supporting element, a box or a container. The particular type of load item is selected in dependence of what goods it is intended to store. Often the goods are pieces/elements or tubs or pots or parcels, but it may also be powder or liquids. A load item may be a box e.g. with a rectangular bottom, sides and an upward opening, it may be provided with a lid; or a tray with only slightly raised edges; or a substantially flat board or any other element suitable for carrying the goods to be stored in the storage rack and suitable for being handled and moved by the transportation means. The load item may be made from plastics such as PVC, metal, wood, or any combination thereof.

RELATED PRIOR ART

US2010/0307989 discloses a storage rack with a transport device in the form of an elevator. The storage rack is configured with two opposing cabinet structures with an elevator shaft between them. The cabinet structures have side walls and container supports disposed in pairs on opposite side walls of a cabinet to form storage locations for containers. An elevator that has a width, spanning the full width of the cabinets, can move up and down in the elevator shaft and is configured with a slide that can move along the width of the elevator and carry containers on the slide side-by-side. The containers can be unloaded from the slide and placed into their storage positions or removed from the storage positions and loaded onto the slide. In an embodiment the cabinets are eight container columns wide and the slide is four containers wide. The storage rack is arranged as a tower and one of the cabinets comprises an opening that is as wide as the slide and is positioned at a lower portion of the tower where an operator can access goods stored in the containers.

This storage rack suffers from problems related to deflection of the elevator carrying the slide since the elevator spans a greater length. Low deflection is desired since it gives a precise, reliable and thus fast mechanical system, but it comes at a very high cost and with a very heavy construction. Thus an undesired trade-off comes with this storage rack and its transport device. Further, this prior art storage rack suffers from a lack of efficiency in bringing the containers forth and back from their storage positions.

SUMMARY

There is provided vertical lift storage system, comprising: a storage rack configured to store load units; a lift system with an upwardly and downwardly movable carrier structure, wherein the carrier structure is configured with a carrier floor for carrying multiple load units at respective multiple sections thereof and with first transportation means configured to insert and withdraw respective load units into and from the storage rack. The carrier structure is configured with second transportation means for shifting load units sideways across the carrier floor between its sections.

Consequently, collection of multiple load units stored in the outermost columns at respective vertical rack positions above one another can be performed very efficiently. For instance, the carrier structure can withdraw a first load unit from a rightmost column of the rack at a first vertical level to load it onto its rightmost section, then it can shift that load unit one or more sections to the left, move one or more vertical levels up or down and withdraw a second load unit from the rightmost column of the rack onto its rightmost section. Then the carrier structure, carrying the first and second load unit, can travel to a feed opening for the first load unit or goods stored therein to be unloaded or conveyed to another machine. This improves efficiency of a vertical lift storage system in terms of the time it takes to store or retrieve load units.

An order is a request for storing or retrieving one or more load items. A full order is a request for as many load items as the carrier unit can carry at the same time (typically with all if its sections loaded). The operations performed by the vertical lift system from when the carrier structure is empty (not carrying any load units) until it has delivered a full order at the feed opening is sometimes denoted a retrieve cycle. Likewise, a storage cycle includes the operations from departing the feed opening with a full load of load items until all load items are stored in the rack.

There are various situations where the ability to shift load units sideways (laterally) on the carrier structure between its sections improves efficiency. For instance when an order involves multiple load items stored in the same outermost columns at different vertical levels or, in case the carrier structure serves opposing racks at either side or the carrier structure, an order involves two load items stored in the opposing columns at the same vertical position.

In some embodiments the vertical lift system comprises opposing storage racks where the lift system is arranged with its carrier structure moving upwardly and downwardly in a shaft (elevator shaft) disposed between the opposing storage racks. The first transportation means are then configured to bi-directionally (forwardly or backwardly) insert and withdraw respective load units into and from either of the opposing storage racks or opposing sections of a storage rack. Thus the first storage means can extend in a forward direction to withdraw or insert a load unit from/to a storage rack or a section thereof in the forward direction; additionally the first transportation means may be configured to extend in a backward direction to withdraw or insert a load unit from/to a storage rack or a section thereof in the backward direction relative to the carrier structure.

The carrier structure can carry multiple load items side-by-side at the same time at respective sections, which may also be denoted spaces or portions.

The first and second transportation means moves the load items mainly in a horizontal plane relative to the carrier structure. However, the first and/or second transportation means may comprise means to raise or lower the first and/or second transportation means inter alia in order to overcome friction between a load item and its support (in the form of a shelf, a bracket, or the first and/or second transportation means) where it is (temporarily) placed.

In an embodiment multiple sections of the carrier structure are equipped with the first means to insert and withdraw respective load units into and from the storage rack and with the second means to shift load units sideways on the carrier structure from one of its section to another. In some embodiments each section is equipped the first and second transportation means. The first and second transportation means of a respective section can be selectively or individually controlled such that different sections can perform individual transportation operations. For instance at a first section a load unit is retrieved (loaded onto the section) while at a second section a load unit is shifted one or more sections in the sideways direction to give space for another load unit. Also, multiple sections (e.g. all sections) of the carrier structure can simultaneously (or nearly simultaneously) insert and/or withdraw load items. The latter is convenient e.g. in connection with loading or offloading the full load of the carrier structure e.g. at a feed opening for placing the full load at a counter where an operator, robot or vehicle can access the load items. Alternatively, for placing the full load at conveyor that can transport the load items to another vertical lift system or another machine e.g. a machine for packaging the load items of goods stored therein. A reverse order of operations to store load items may equally well take place.

In some other embodiments, the first transportation means are configured to move across sections in the sideways direction to serve one section at a time. In some embodiments, multiple of such first transportation means that can move across sections are employed onboard the same carrier structure.

Generally, the second transportation means has support faces that support and moves the load items at a fixed horizontal level relative to the carrier structure when the carrier structure is in normal operation. The first transportation means are configured to move slightly below the fixed horizontal level and/or slightly above to lift/leave or push/draw the load item to perform the inserting and withdrawing of respective load units into and from the storage rack. The second transportation means (which can be rollers) can then be attached to the carrier structure by means of a bearing with a fixed position allowing the second transportation means to rotate or oscillate in two or three dimensions.

In an embodiment, the first and second transportation means are integrated to transport a load item in dual orthogonal directions. This may be accomplished by means of sliding rollers that extendable along their longitudinal axis to insert or withdraw a load item into or from the storage rack, where the rollers perform the sideways shift. Alternatively, by means of telescopic arms with support faces that telescopically extends to insert or withdraw a load item into or from the storage rack and vibrates in an oscillating manner to stepwise move the load item.

In some embodiments the carrier structure is a frame with longitudinal lateral elements or beams made from a metal profile. The lateral elements are interconnected by transverse bracing elements also made from a metal profile. The carrier structure is attached to a hoist mechanism.

In some embodiments the hoist mechanism comprises an electrical motor, a drive shaft with a belt pulley, a reel or a toothed wheel to drive a belts, cable or chain attached to the carrier structure for moving it upwardly and downwardly. In some embodiments one, two, three, four or more belts, cables or chains are attached to hoist the carrier structure. In some embodiments, vertical guide rails are employed to prevent the carrier structure from reeling and/or tilting. Alternative hoist mechanisms can be of the hydraulic or pneumatic type employing sliding cylinders to effectuate the upwards or downwards movement. Such hoist mechanisms are well-known in the art.

In some embodiments the second transportation means are configured with multiple drive means for driving respective multiple sections individually from one another and/or in synchronism. Consequently, load units can be individually shifted sideways and the same direction or in opposite direction or some can be shifted while one or more other load units are standing still. This greatly improves flexibility and efficiency of a vertical lift storage system.

In some embodiments the first transportation means are configured with multiple drive means for inserting and withdrawing load units from/to respective sections individually from one another and/or in synchronism. In this way load units can be retrieved or inserted one-by-one or more at a time.

In some embodiments the first transportation means are configured with drive means for raising and lowering load units on respective sections in synchronism relative to the carrier floor. Thereby, since a simpler drive, lifting all load units on the carrier floor at the same time, can be utilized manufacturing costs can be reduced.

The drive means comprises any configuration that can perform the above functions and may comprise a controller for an electrical motor and/or an electrical motor and/or mechanical gear and/or mechanical shafts, spindles, toothracks, belts, chains or any combination thereof. Suitable embodiments are described with reference to the drawings.

In some embodiments the first transportation means has a transversely displaceable unit operating in concert with a lift and/or clutch mechanism to perform the inserting and withdrawing of respective load containers; and the second transportation means has rollers to perform the shifting of load containers sideways on the carrier structure between sections.

Thereby a relatively simple mechanical construction that enables movement of the load items in both the transverse and sideways (lateral) direction is provided. The rollers are disposed transverse to the carrier structure to rotate about their longitudinal axis. One, two or more rollers can be disposed between two neighbouring first transportation means. The first transportation means are elongated (and arranged parallel to the rollers) to accommodate movement to insert and withdraw respective load units into and from the storage rack in a transverse direction. The first transportation means can be a lifting type which is lowered slightly below a load unit to leave the load while it slides below or slightly raised to lift a load unit and thereby to insert or withdraw a load unit. Alternatively, the first transportation means can be of a clutch type which is engaged or disengaged to connect with a load unit or a mechanism thereon complementary with the clutch. The clutch can move transverse to the carrier structure below a load unit to change position from one side of the carrier structure to the other. The clutch can be raised and/or engaged to bring the load unit along.

In some embodiments a roller is configured as an elongated cylinder (possibly divided into sections). It may have a depression reducing its diameter and fitted to give space for a drive belt driving the roller by a motor. In some embodiments multiple parallel rollers are driven by a drive belt extending in a loop to drive the rollers and to take a path below the first transportation means (taking a w-like path). Thereby multiple rollers can be driven by a single motor without a drive mechanism thereby being in the way for the second transportation means. Alternatively, rollers may be driven by respective motors e.g. disposed within the respective rollers.

In some embodiments the first transportation means are configured with a support face; a telescopic arm configured to move the support face in and out, and means to lower and raise the support face relative to the carrier structure.

Thereby the first transportation means are configured as a lifting type which is lowered slightly below a load unit to leave the load while it slides below or is slightly raised to lift a load unit and thereby to insert or withdraw a load unit. This configuration can give a gentle handling of the load units since they are only to a limited extent exposed to drag and thus frictional wear.

In some embodiments, the first transportation means at a given section is configured with one telescopic arm with a respective support face to carry (i.e. insert or withdraw) one load item at a time. In other embodiments, two or more support faces may be moved by respective telescopic arms operated synchronously to transport a (single) load item. For instance two arms are moved synchronously to transport one load item. Thereby the first transport means have an improved sideways stability. Such two or more arms can be operated synchronously by driving them with common drive means (such as a motor). Alternatively, by driving their respective drive means synchronously.

The support face may be made from a metal sheet with a flat shape, an L-shape, an upturned U-shape or any other suitable shape. The support face may have longitudinal or transverse ribs for reinforcing the support face or for increasing or decreasing friction against load units. The support face may have a painted surface or a coated surface e.g. coated with an anti-slip coating.

The telescopic arm may have one or more e.g. three arm sections where one arm section is attached to the carrier structure (optionally via mounting frame), a second arm section is attached to the support face and a third (or more) arm section(s) interconnect(s) the first and second arm section in a way to allow the arm to perform a telescopic extension and contraction. The third (and optionally more sections) allows the support face to be fully outstretched beyond lateral elements of the carrier structure.

The telescopic arm is configured to bring the support face and any load item it may carry from a first extended position to a central position (on the carrier structure) and to a second extended position (opposite the first extended position). Thereby the telescopic arm can serve two opposing storage racks (or a storage rack and a feed opening; or a lateral conveyor and a feed opening; or other combinations thereof) on either side of the elevator shaft where the carrier structure moves up and down.

The support face may be raised or lowered by a mechanism on the telescopic arm, i.e. relative to the telescopic arm. Alternatively, the telescopic arm is attached to a mechanism for raising or lowering the telescopic arm with the support face. In an embodiment the arm is attached pivotally and eccentrically to one or more wheels coupled to rotate by the drive of a motor. In an embodiment, the support face is kept horizontal and in another the support face is tilted slightly.

In some embodiments the carrier structure comprises first and second elongated lateral elements; and the first transportation means are configured with a travelling clutch configured for engaging or disengaging with a load container and for travelling in direction transverse to the elongated lateral elements.

The clutch is configured to catch, grip or engage with a load unit or a mechanism thereon complementary with the clutch. Such a complementary mechanism can be a downwardly extending flange or edge, a downwardly or upwardly extending cavity, an area sufficiently strong or reinforced to withstand physical contact with the clutch when it engages to move the load item. Correspondingly, the clutch is configured to release or disengage with the load unit.

The clutch can move transverse to the carrier structure below a load unit to change position from one side of the carrier structure to the other. The clutch can be raised and/or engaged to bring the load unit along e.g. by rotating the clutch between a raised position and a lowered position which may be about 90 degrees apart or more or less e.g. 100 or 110 degrees or 80 or 70 degrees. The clutch may be in the form of a rotatable or risible arm or tongue.

The clutch may be moved back and forth from one side of the carrier structure to the other by a spindle or tooth rack that extends in the transverse direction.

In some embodiments the carrier structure comprises first and second elongated lateral elements, where the first and second transportation means are disposed transverse to the lateral elements, and where a first and second of the first transportation means are disposed with one or more second transportation means in between.

This makes it possible to configure the carrier structure with the first and second transportation means according to size and shape of the load items to be handled by the system. For instance, as many rollers as needed may be disposed between the first transportation means.

In general, the carrier structure has a payload area whereon it can carry the load items. This payload area roughly has a size corresponding to the area occupied by all those load items that can be loaded onto the carrier structure at the same time. The payload area is divided into a respective number of sections. Thus a section has an area substantially equaling the foot print of a load container plus any clearance space between them to allow a straight transverse insertion into or withdrawal from the storage rack. The payload area may be larger than this area. The carrier structure may have an area larger than the payload area.

In some embodiments a carrier structure is configured to carry 4, 6, 8, 9, 16 or any other number of load items and it has a respective number of sections.

In some embodiments the vertical lift storage system comprises multiple self-supporting units with a frame carrying the first transportation means and the second transportation means.

One unit per section can be employed on the carrier structure and provides a modular construction of the carrier structure with its first and second transportation means. In some embodiments the unit comprises the drive means for moving the first and second transportation means. In an embodiment a unit comprises two telescopic arms with respective support faces and three rollers (or three sets of rollers)

In some embodiments the transportation means are arranged in an array of sections; the first transportation means of a respective section can be in a first mechanical state wherein it is engaged for moving a respective load container and a second mechanical state where it is disengaged from the respective load container; where a transition from the first mechanical state to the second mechanical state takes place while a respective load container is situated on the respective section; and where the respective load container is leaved by the first transportation means in contact with the second transportation means for the load container to be moved by frictional contact.

Thereby the second transportation means can be attached to the carrier structure or a mounting frame or the like without a (suspension) mechanism for raising or lowering the second transportation means. Thus, the second transportation means can be brought into frictional contact with a load item by controlling the first transportation means.

In some embodiments each section comprises guides that are configured to keep the load unit in place when it is moved in the transverse direction; where the guides are controllably raised or lowered.

In some embodiments the guides are configured like a fence or cushion that can be raised during transverse movement of the load item and lowered e.g. during longitudinal movement of the load item. A tendency of a load item to go askew about its upright axis (i.e. in a horizontal plane) when it is inserted or withdrawn can be corrected by the guide to bring it onto the carrier structure along a substantially straight path. The guide may serve a similar purpose when the load item is inserted. In some embodiments one or more guides are mounted with (on) a self-supporting unit and/or between self-supporting units.

In some embodiments the vertical lift storage system comprises a cover enclosing the vertical lift system configured to shield off the interior of the system from undesired interference; said cover comprising a first feed opening extending in the longitudinal direction and a second feed opening in the transverse direction.

The cover is configured to prevent people in vicinity of the vertical lift storage system from accidentally getting injured by moving parts of the system i.e. for safety reasons. The cover may also protect goods stored in the system from being picked in an unauthorized way. In some embodiments the cover is made of metal sheets. Alternatively, the cover may be made from a woven or non-woven fabric, adhered fibres being of a synthetic, natural or a composite material.

In some embodiments the first feed opening is disposed in the range from half a meter to two meters above a floor level. In some embodiments a counter is disposed in front of the first feed opening for a human operator to access the load items. The counter may have a horizontally oriented desktop. Further, the counter may be provided with means for inclining the desktop downwardly towards the operator to ease his/hers access to the load items.

In some embodiments the second feed opening is disposed at the side of the vertical lift storage system to face an end portion of the carrier structure when it is vertically positioned therefore. Such a feed opening is suitable for conveying load items from the carrier structure and onto an external machine which may be another vertical lift storage system, a conveyor or another type of machine and/or vehicle.

Generally, 'pick-from' load items are load items retrieved from the storage rack and containing goods to retrieve from the storage. An order may list pieces of goods stored in different 'pick-from' load items. Whereas pieces listed in an order to retrieved from the storage and put into a 'pick-to' load item which is then output for shipping or transport to another local or global destination. 'Pick-to load' items may also be partially full load items. In an embodiment pick-from load items are delivered by the carrier structure at a counter at one side of the first feed opening whereas (empty) pick-to load items are delivered at the counter at the other side of first feed opening. When a pick-to load item is ready for transport, it is retrieved from the counter and conveyed out via the second feed opening. Thereby a human operator does not need to make repeated twisting movements with his body when alternately accessing pick-from and pick-to load items.

In some embodiments the storage rack comprises brackets configured with a back fitting and a support structure, where the support structure is configured to carry at least one load item; and a back wall configured with a support structure or interconnection means for complementary interconnection with the back fitting for carrying the brackets and load items stored therein.

Configuration of the rack system with brackets and a back wall carrying the brackets provides a flexible storage rack. In some embodiments the back wall is configured with the support structure or interconnection means arranged in a modular structure. The modular structure has a modular size in a vertical direction. The modular size may correspond to the height of a load item or the height of the bracket plus a certain vertical clearance space. The modular size may also be greater than or less than that modular size. The configuration of the rack system with brackets may provide improved flexibility for handling load items of varying height and/or width.

In some embodiments the support structure of the back wall comprises vertical and/or horizontal metal profiles that are extruded or bent or pressed from metal sheet. In some embodiment the back wall is made of plates with an undulating structure (e.g. a so-called trapeze plate or other profile structure). In some embodiments the back wall comprises interconnection means that comprise holes (with a shape that is e.g. circular, oblong or rectangular) arranged in vertical columns. Correspondingly, the interconnection means of the brackets may comprise pins or hooks to securely and detachably suspend the bracket on the back wall.

In some embodiments the brackets are made of pressed metal plate in an L-shape forming the support structure as a bottom portion or flange supporting a load item (at one of its sides) and a side portion with the back fitting. Left and right, L-shaped brackets can be provided. In some embodiments the bracket is T-shaped (upturned T) to support a load item on both of its sides.

Generally, the load items are stored in orderly or straight columns and at least to some extend in layers, storeys or vertical levels with fixed or variable mutual vertical spacing.

In some embodiments the storage rack comprises multiple interior walls and brackets; where the interior walls and the brackets are configured for attaching the brackets to the interior wall in order to provide sideways support for carrying the load items.

Such embodiments are expedient in that the interior walls can carry a relatively high load and in that the brackets in an expedient way can transfer the downwards force from the weight of the load items to the walls. The brackets can be attached to the wall by conventional mechanical mounting or suspension mechanisms.

In some embodiments the vertical lift storage system comprises a shelf with a recess fitted to telescopic arms or lifting means.

The one or more recesses makes it possible to extend telescopic arms in and under the load item and raise the arm or a support face thereof to lift the load item off the shelf and to lower the arm to place the load item on the shelf.

Such a shelf may be configured to carry multiple load items side-by-side e.g. two, four, five, eight or any other number of load items. In some embodiments the shelf is attached to exterior walls of the storage rack, an interior wall and/or a back wall of the storage rack. In some embodiments the shelf is reinforced to counteract deflection from the weight of the load items. The reinforcement may comprise longitudinal and/or transverse profiles e.g. of metal. In some embodiments the shelf is made from metal.

In some embodiments the storage rack comprises a conveyor to shift load containers sideways on the conveyor, and where the conveyor is disposed such that the first transportation means can insert and withdraw load items onto and from the conveyor when the carrier structure is in vertical level with the conveyor.

Thereby it is possible to transport load items from one vertical lift storage system to another via the conveyor. This improves flexibility in terms of the way pieces of goods are distributed (stored) in the systems. An operator operating a first system may access load items of another system via such a conveyor. This may reduce the extent of manual operations (he/she doesn't have to walk from one system to the other to operate that and then walk back). In some embodiments two or more systems are arranged as neighbouring systems with a straight conveyor interconnecting them.

The storage rack occupies a rack area and the carrier structure runs up and down in an elevator shaft occupying a lift area. The conveyor is disposed at a certain vertical level or at a certain story within the rack area. In some embodiments the conveyor is disposed at a lower level e.g. at the same level as the counter but in an opposing rack or below the counter or at any other level. The conveyer comprises rollers which may be disposed at a distance to give clearance for telescopic arms of the first transportation means. In some embodiments the load items are moved onto the conveyor and retrieved there from by means of the first transportation means.

In some embodiments the storage system comprises a first and second vertical lift storage system and a transmission section disposed at a vertical level to convey load containers between respective carrier structures of the first and second vertical lift storage system when they are vertically aligned with the transmission section.

The transmission section may provide a bridge (transmission section) for load items supplied by a first carrier structure and received by a second carrier structure of the respective systems. The load items are conveyed across respective end portions of the carrier structures in a longitudinal direction. In some embodiments the transmission section comprises idle rollers or driven rollers or a belt conveyor or some type of extractor shaft or a table.

The carrier floor may be embodied in various ways; for instance when the first transport means are rollers and the second transport means are telescopic arms with a platform, the floor is constituted by those portions thereof carrying load items when they are disposed thereon. The carrier floor is a structure whereon load items can be moved by the first and second transport means and be carried/placed in a substantially horizontal position.

There is also provided a method of operating a carrier structure in a vertical lift storage system comprising: moving the carrier structure to a first vertical level; activating first transportation means to withdraw a first load unit from a predetermined column in a storage rack arranged next to the carrier structure and place it on a respective section on a carrier floor of the carrier structure; and activating first drive means of the respective section and second drive means of a section next to the respective section to shift the first load unit sideways across the carrier floor from its respective section to the section next to it.

In some embodiments the method comprises: activating first transportation means a further time to withdraw a second load unit from the predetermined column in the storage rack and place it on the respective section on a carrier floor of the carrier structure.

In some embodiments the method comprises: withdrawing the first load unit from a forward direction in the storage rack and withdrawing the second load unit from a backward position in the storage rack.

In some embodiments the method comprises: moving the carrier structure to a second vertical level, different from the first vertical level, to perform withdrawing of the second load unit from the second vertical level.

In some embodiments the method comprises: activating respective drive means of selected sections in synchronism to contemporaneously shift respective load units sideways across the carrier floor.

In some embodiments the method comprises: performing the activation of the first drive means and the activation of the second drive means of respective sections contemporaneously while third drive means of a third section to shift a load unit sideways are controlled to stand still.

In some embodiments the method comprises: raising a stop element at one side of a destination section such that it remains in a raised position while a load unit is moved sideways, from the opposite side, to that destination section. In some embodiments the load unit is moved sideways until the load unit is aligned with or abutting the stop element.

There is also provided a computer loaded with a programme for performing the above method and a computer-readable medium encoded with a programme for performing the method when run by a computer. A person skilled in the art will know how to prepare such a programme and how to connect the computer with appropriate sensors and actuators to implement the above method given in the present specification.

DETAILED DESCRIPTION

Figure 1A:
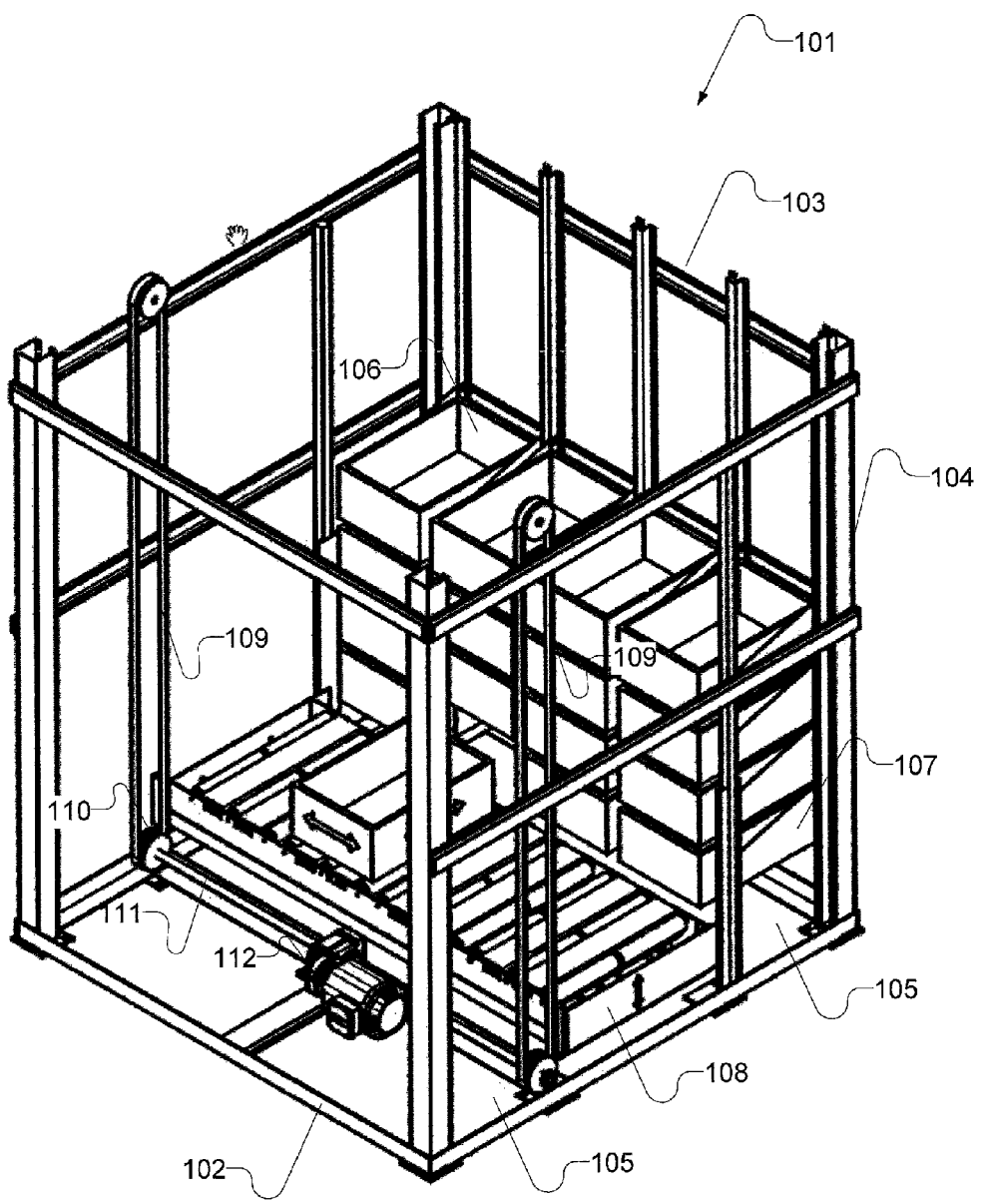
FIG. 1 shows a vertical lift storage system.
Figure 1D:
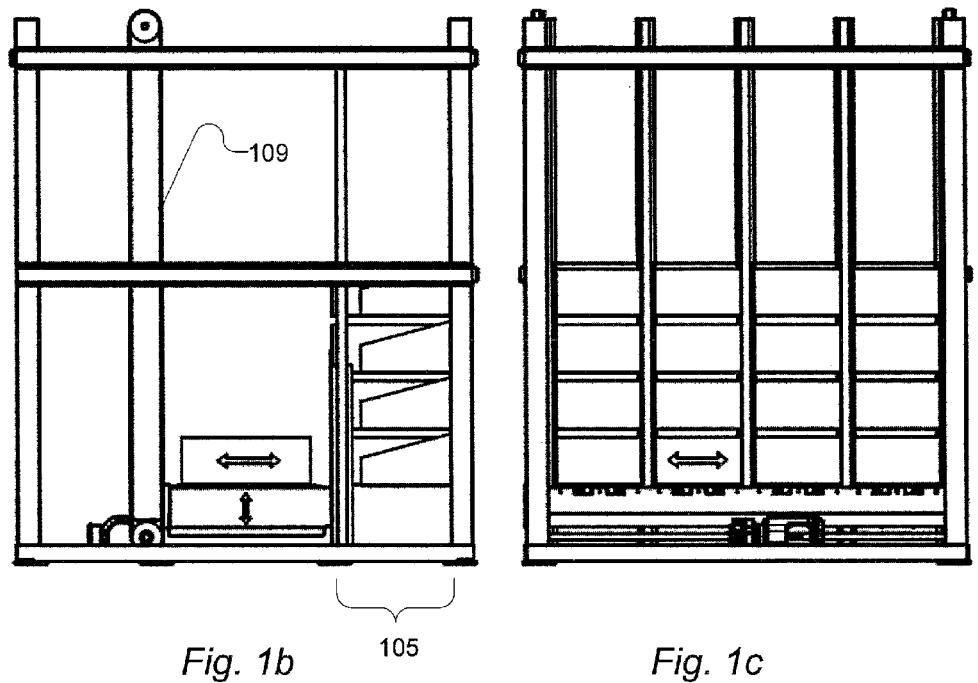
Figure 1D:
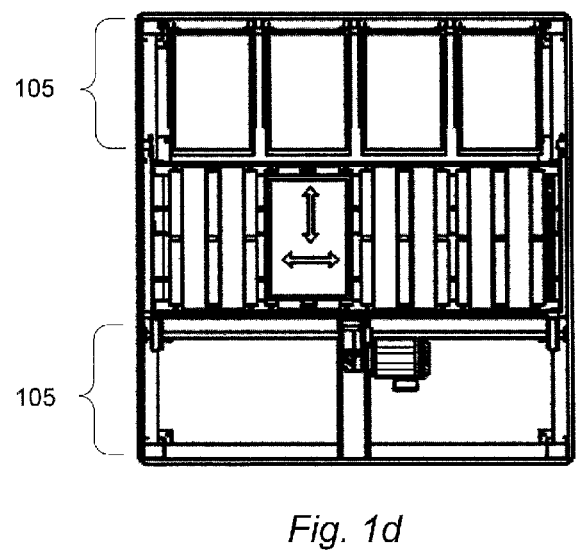

FIG. 1 shows a vertical lift storage system. FIG. 1a is a perspective view; FIG. 1b is a first side view; FIG. 1c is a second side view and FIG. 1d is a top view.

The vertical lift storage system is generally designated by reference numeral 101. It comprises a frame structure 102 with vertical and horizontal metal profiles 103; 104. The system 101 comprises a storage rack section 105 that stores some load items 106. The storage rack 105 comprises brackets 107 supporting the load items 106. The storage rack 105 is configured to store the load items in straight columns at equally spaced levels. The storage rack 105 is disposed on either side of an elevator shaft wherein the carrier structure 108 is upwardly and downwardly movable. Only the distant rack section contains load items in this view.

A hoist mechanism configured to move the carrier structure 108 up and down and to hold it in at a specified vertical level comprises a first and second belt 109 attached to the carrier structure 108. The belt is driven by respective pulley wheels 110 on a drive shaft 111 coupled to an electrical motor 112. The hoist mechanism is mainly situated at a lower portion of the vertical lift storage system to ease maintenance access.

The carrier structure 108 can move the load item situated thereon sideways in a longitudinal direction of the carrier structure 108 by means of its second transportation means (not shown in detail). It can insert and withdraw a load item into and from the storage rack by means of its first transportation means (not shown in detail). The carrier structure comprises elongated lateral elements and transverse beams extending between the lateral elements. The carrier structure 108 is sufficiently long to span the full width of the storage rack and thus to access the load items of all the columns of a rack section 105.

FIG. 2 shows the first and second transportation means configured as a unit. FIG. 2a is a perspective view; FIG. 2b is a first side view; FIG. 2c is a second side view and FIG. 2d is a top view. The unit is generally designated by reference numeral 201. In some embodiments the unit 201 is a self-supporting unit with a frame 202 carrying the first transportation means 203 and the second transportation means 204. The second transportation means 204 are embodied as rollers, where the rollers of the unit 201 are driven in common by a belt 205. Wheels 206 and the rollers control the path of the belt 205. As shown, the rollers are configured as an elongated cylinder (in some embodiments divided into sections) and it has a depression reducing its diameter and fitted to give space for the belt 205 driving the roller by a motor 207.

The first transportation means 203 has a vertical support face configured to carry a load item on its face. The support faces are held in a central position where it would be within the bounds of the carrier structure 108 such that it can move freely up and down next to one or more storage racks.

The frame 202 is in this view shown to carry only some of its elements, but in some embodiments it carries all or substantially all components of the first and second transportation means.

In some embodiments a mechanism (not shown) configured to raise or lower the unit 201 is disposed on the carrier structure 108. The unit 201 is thereby upwards and downwards movable relative to the carrier structure 108. Such upwards and downwards movement is typically about 2 cm, but it can be more e.g. 2.5 cm, 3 cm, or 4 cm, or less e.g. 1.8 cm, 1.5 cm or 1 cm.

In some embodiments the first transportation means are mounted on the unit 201 and its mounting frame 202, whereas the second transportation means 204 e.g. in the form of rollers are rotatable mounted on lateral elements (not shown) of the carrier structure 108. The lateral elements may comprise upwardly extending flanges with holes for axles of the rollers. A unit 102 carries the first transportation means 203. A mechanism (not shown) configured to raise or lower the unit 201 is disposed on the carrier structure 108. The first transportation means 203 on the unit 201 is thereby upwards and downwards movable relative to the carrier structure 108 and the second transportation means. In some embodiments one or more e.g. all units on a carrier structure are configured to be raised by the mechanism at the same time by the same drive (typically comprising a motor and a belt or chain).

Motor 208 drives a belt or chain 209 that via pulley wheels or toothed wheels 210; 211 in turn drives belts or chains 212 for moving the first transportation means in and out to either side of the carrier structure 108.

Figure 2A:
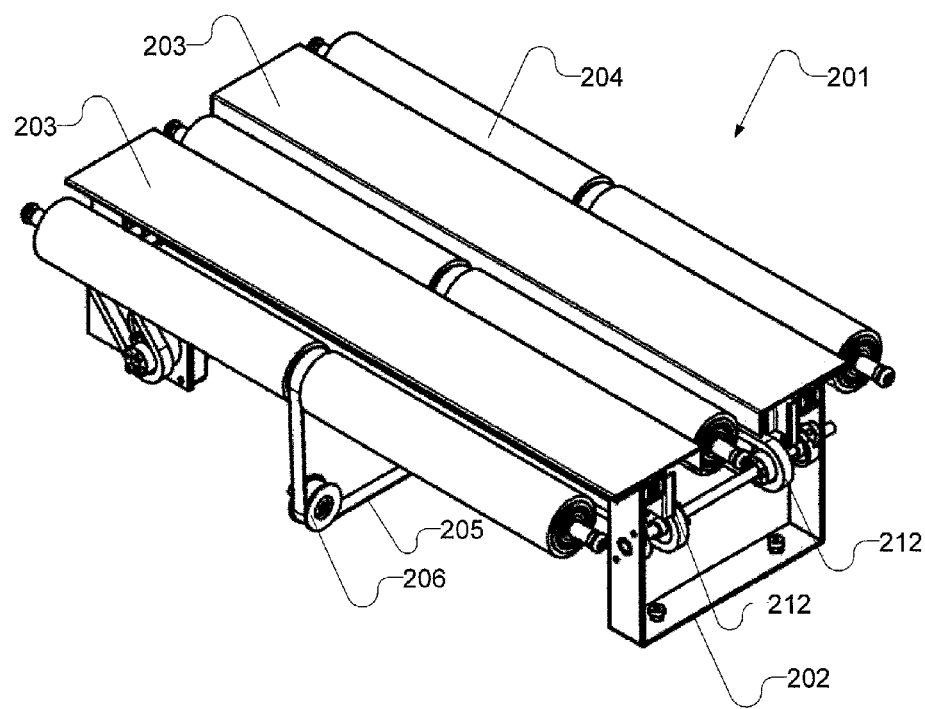
FIG. 2 shows the first and second transportation means configured as a unit.
Figure 2B:
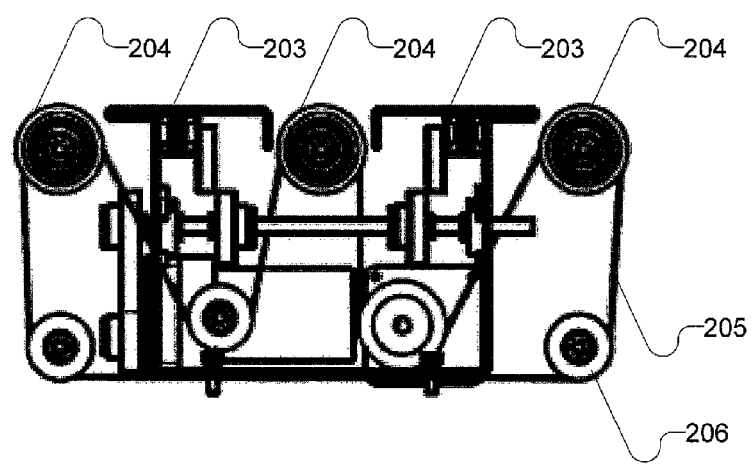
Figure 2C:
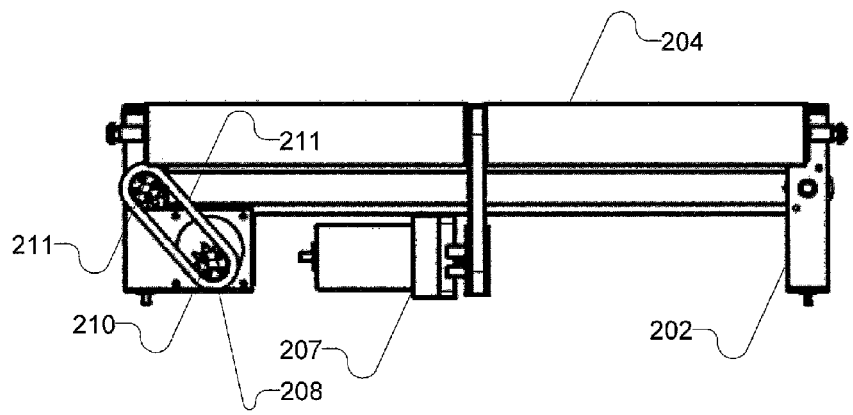
Figure 2D:
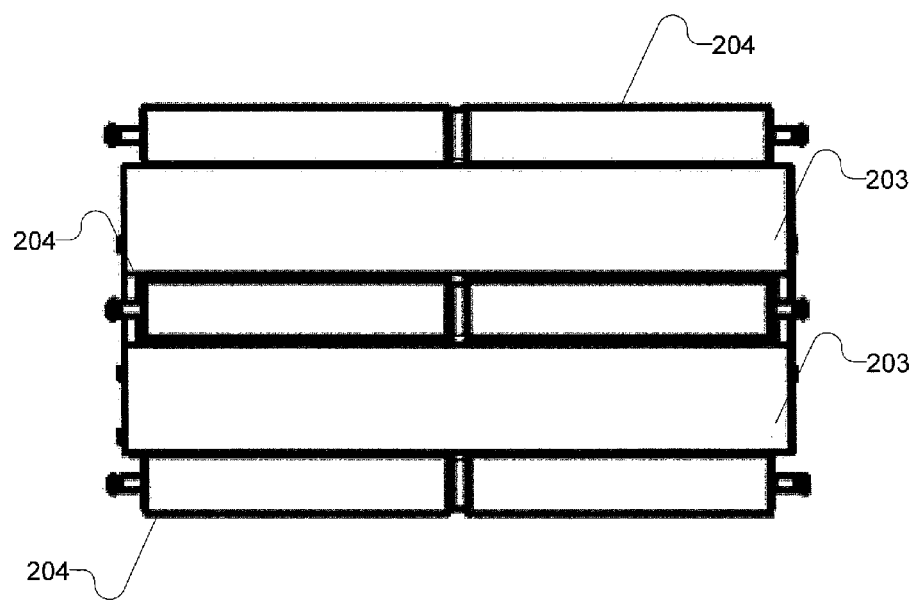

The view of FIG. 2d thus shows a section of the carrier floor corresponding to one unit. In this exemplary embodiment, the carrier floor or more particularly a section thereof is constituted by the rollers 204 and the platforms 203.

Figure 3A:
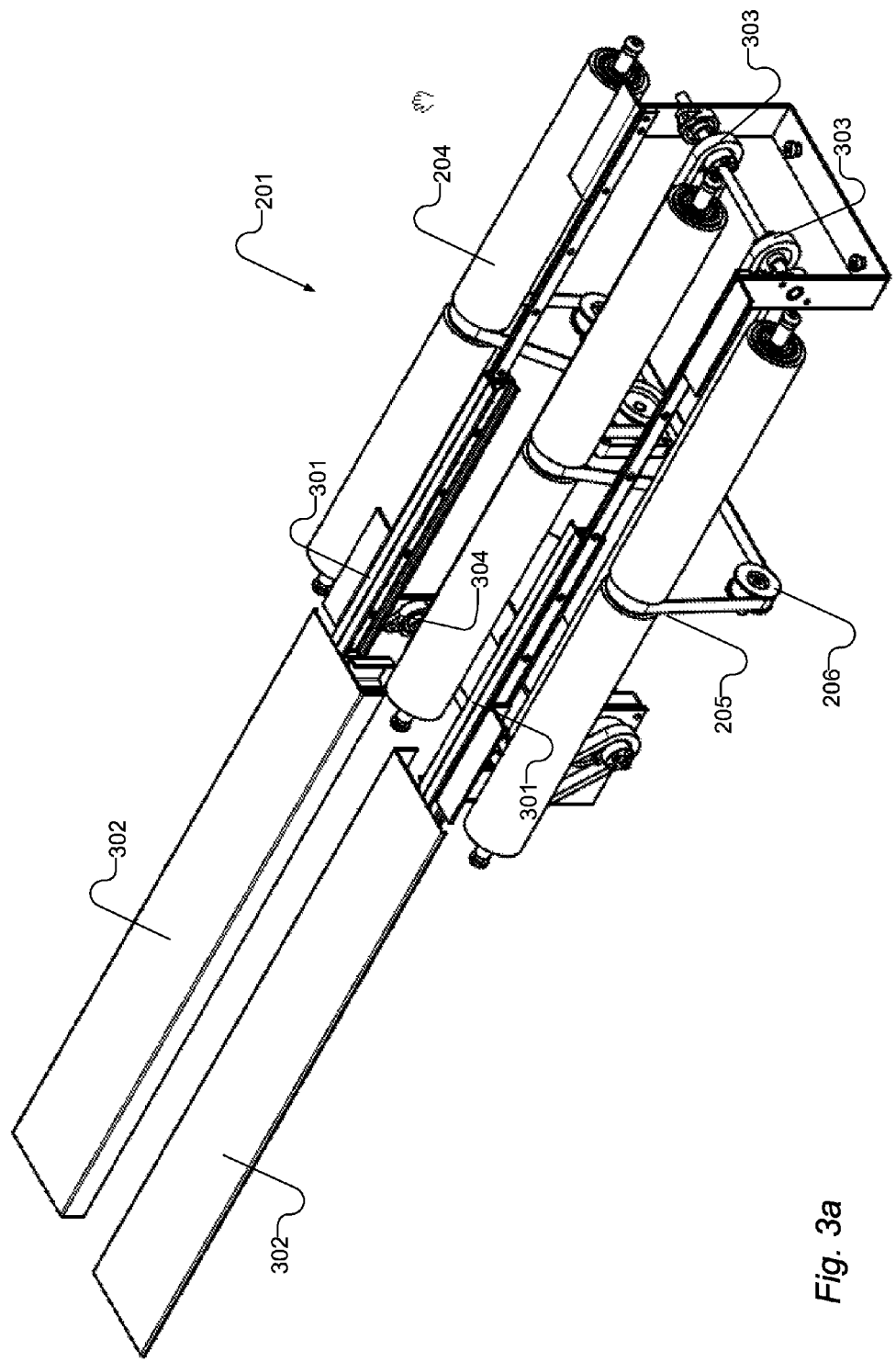
FIG. 3 shows the first transportation means with arms extended to one side and the second transportation means.
Figure 3B:
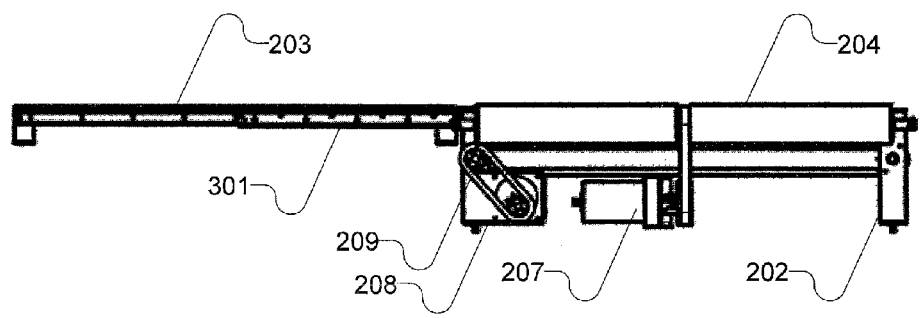
Figure 3C:
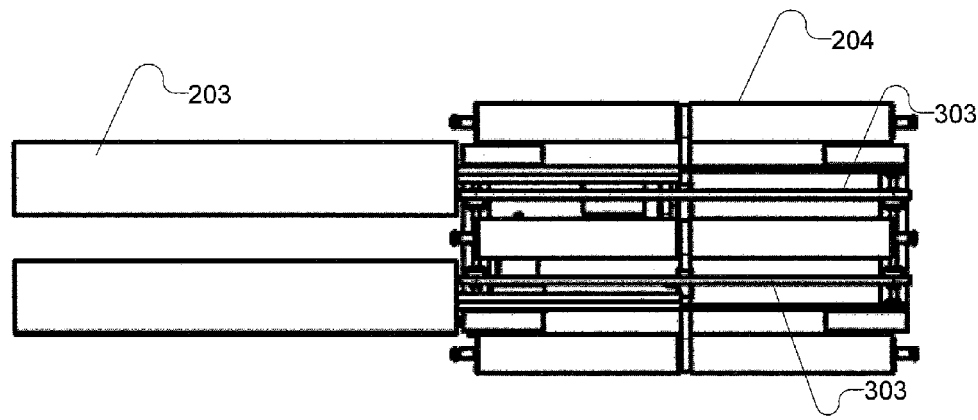

FIG. 3 shows the first transportation means with arms extended to one side and the second transportation means. FIG. 3a is a perspective view; FIG. 3b is a side view; and FIG. 3c is a top view. The arms 301 (also denoted guide rails in the art) are telescopic and comprise multiple (e.g. as shown three) sections where a one section is attached to the frame 202, a second section is attached to the support face 302 and a third (or more) section(s) interconnect(s) the first and second section in a way that allows the arm to perform a telescopic extension and retraction. The third (and optionally more sections) allows the support face to be fully outstretched beyond the bounds or lateral elements of the carrier structure 108. Thereby a load element can be securely placed in a storage rack.

In order to move the support face 302, one or more of the sections of the arm has a pin or hook (not shown) on one or more of its sliding sections, where the pin or hook is positioned relative to a transversely running belt or chain 303 and a hook thereon (not shown) for catching the pin and extending the arm in one direction when the belt 303 moves in a first transverse direction out to a first extended position and for retracting the arm back to its central position when the belt moves in the opposite direction. When the belt 303 moves further in the opposite direction, it may extend the arm in the opposite direction to a second extended position. Thereby the arm can serve opposing storage racks on opposite sides of the carrier structure 108. The arms are shown extended in the first extended position.

As described above, the first transportation means are attached to the unit 201 and components thereof are attached to a mounting frame 202. The rollers 204 are rotatable attached to the carrier frame. The first transportation means and its support faces can then be raised or lowered relative to the carrier structure by lifting the unit, whereas the rollers have a fixed vertical position relative to the carrier structure 108. The unit can be lifted by a mechanism (not shown) that in some embodiments comprises a vertically disposed threaded rod (e.g. four per unit), where a pulley wheel or toothed wheel is fixedly attached to the threaded rod. A belt or chain is driven by a motor and is arranged in a path to rotate the vertically disposed threaded rod(s). The threaded rod disposed in a hole to engage with an internal thread such that the threaded rod moves up and down by rotating the rod. The rod is attached rotatable to the unit. This mechanism can then move the unit and the first transport means thereof vertically relative to the carrier structure.

In other embodiments, the units of a carrier structure can be fixed on a frame structure that can be raised or lowered to move all the units in concert. The mechanism is then attached to raise or lower the frame structure carrying the units.

In some embodiments the arm with rail guide and platform is movable up and down relative to the mounting frame 202 of the carrier structure e.g. by means of a pulley wheel or toothed wheel, where the wheel is rotatable mounted on the mounting frame 202 and the guide rail is fixed by a eccentrically positioned pivot to the wheel, whereby a motor driving the wheel by a belt can raise the arm when it turns one way and lower the arm when it turns the other way. The distance from the centre of the wheel to the pivot determines the extent of the vertical movement.

Alternatively, a sax lift can be used to elevate the arm. Hydraulics and/or pneumatic cylinders may alternatively or additionally be used to elevate the arm. Any combination of the above mechanisms to lift the first transportation means can be employed.

Figure 4A:
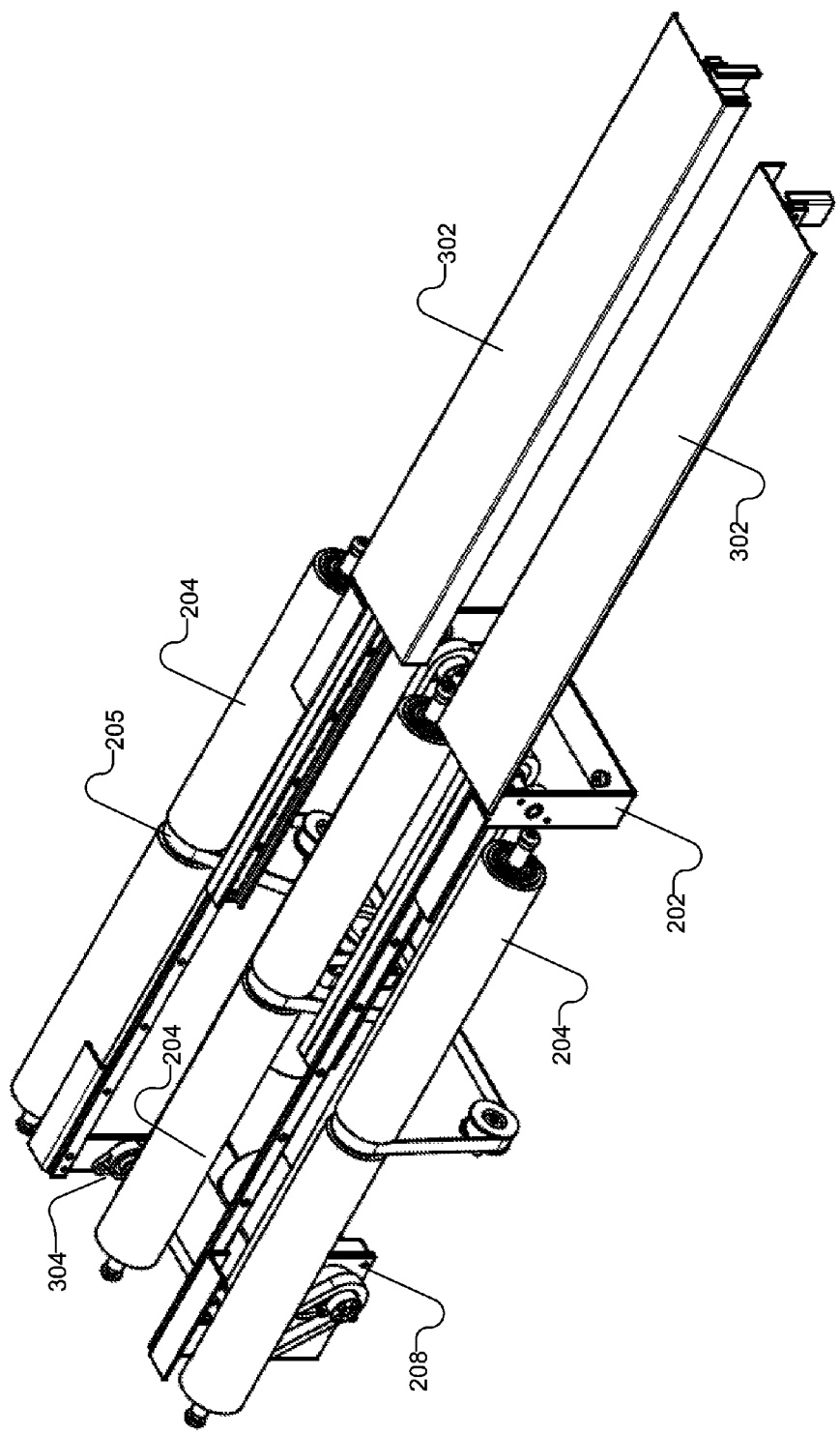
FIG. 4 shows arms of the first transportation means extended to the other side.
Figure 4B:
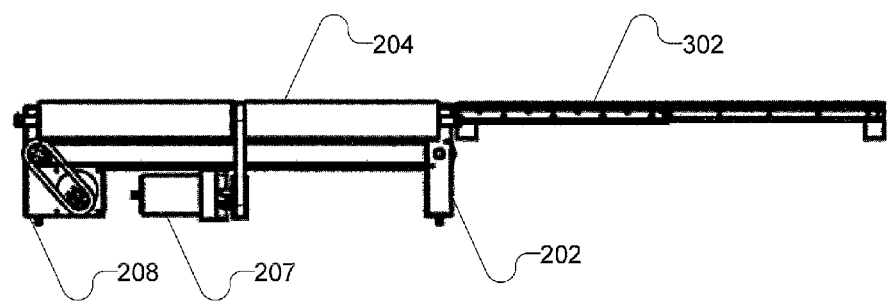
Figure 4C:
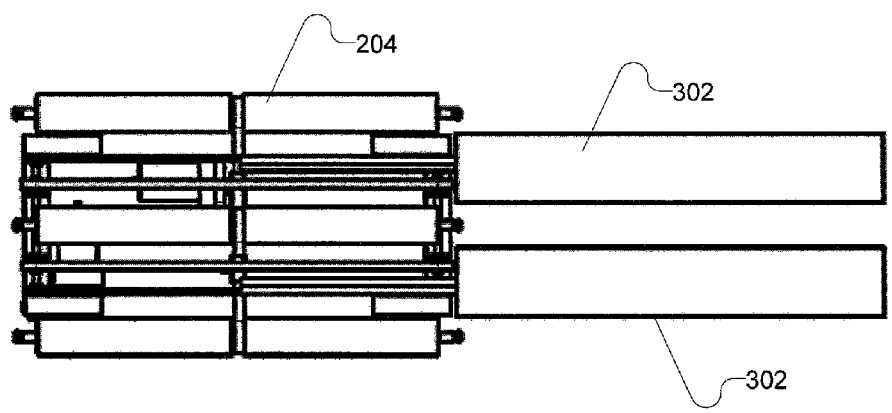

FIG. 4 shows arms of the first transportation means extended to the other side. FIG. 4a is a perspective view; FIG. 4b is a first side view; FIG. 4c is a second side view and FIG. 4d is a top view. With respect to the above description of FIG. 3, the arms are extended to the second extended position. The elements shown in FIG. 4 are mentioned in connection with FIGS. 2 and 3.

Figures 5A, 5B:
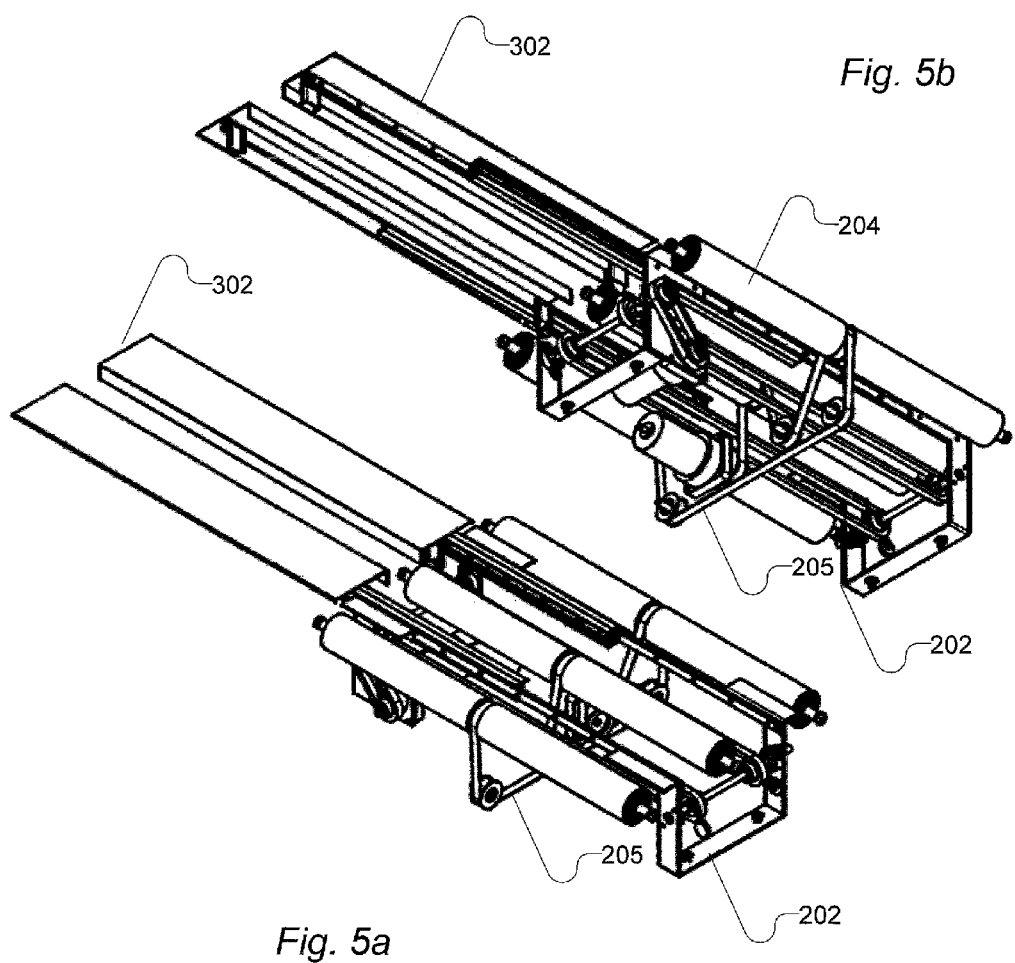
FIG. 5 shows different views of the first and second transportation means.

FIG. 5 shows different views of the first and second transportation means. FIG. 5a is a perspective view from above and FIG. 5b is a perspective view from below. It can be seen that the belt 205 driving the rollers 204 follows a path going around the first transportation means moving in the transverse direction. The support faces 302 are shown in an extended position.

Figure 6:
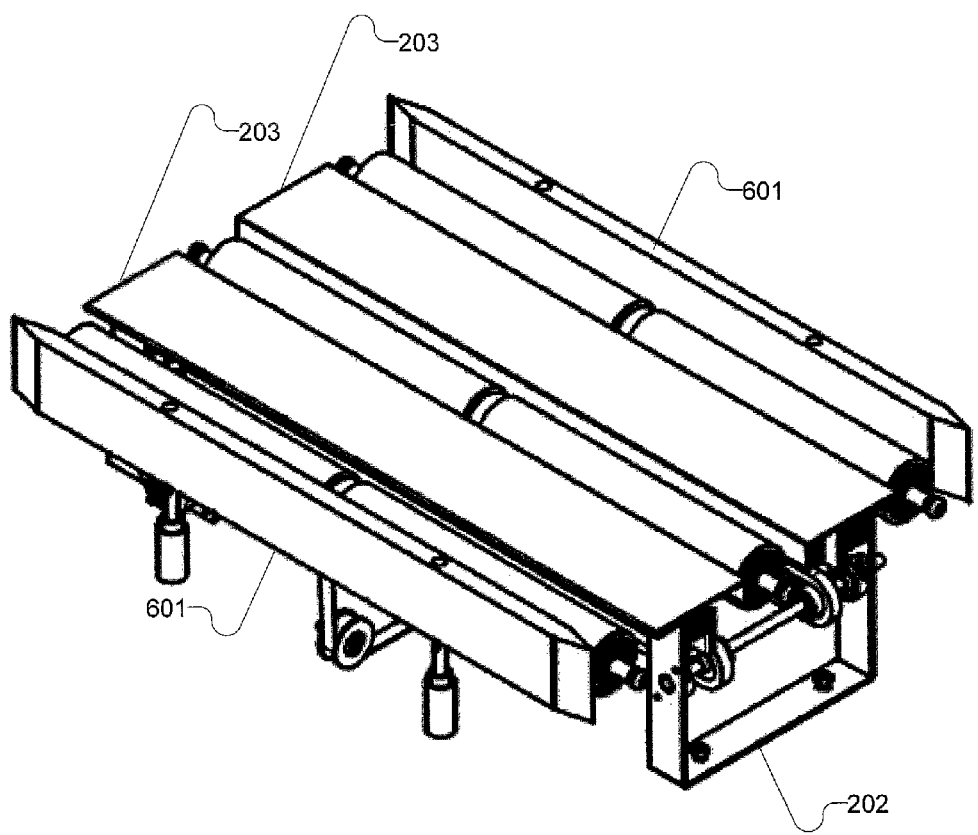
FIG. 6 shows the transportation means with guides.

FIG. 6 shows the transportation means with guides. The transportation means are installed on a frame as a unit 201 as described above. Between such units 201 a guide 601 is disposed. The guide is configured to keep the load unit in place when it is moved in the transverse direction and is configured to be controllably raised or lowered. As shown, in some embodiments, two guides 601 are disposed on either side of a section of the carrier structure and/or on either side of a unit 201. One or more guides can be installed on the frame as a component of the unit. The guide 601 can be raised and lowered by conventional techniques e.g. by means of cam wheel 304 driven by a motor or by other means.

Figure 7A:
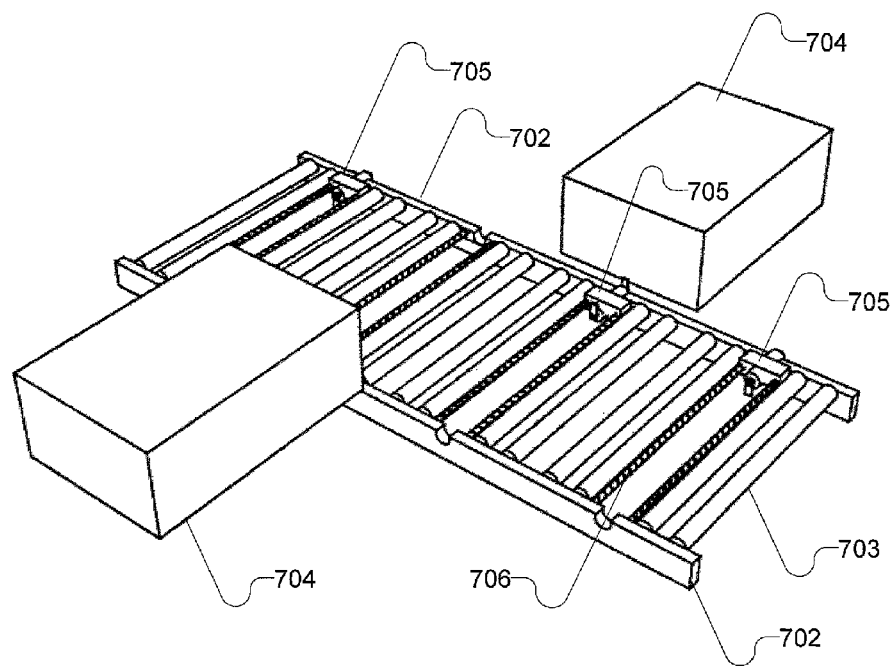
FIG. 7 shows an embodiment of the vertical lift comprising rollers and a movable clutch.
Figure 7B:
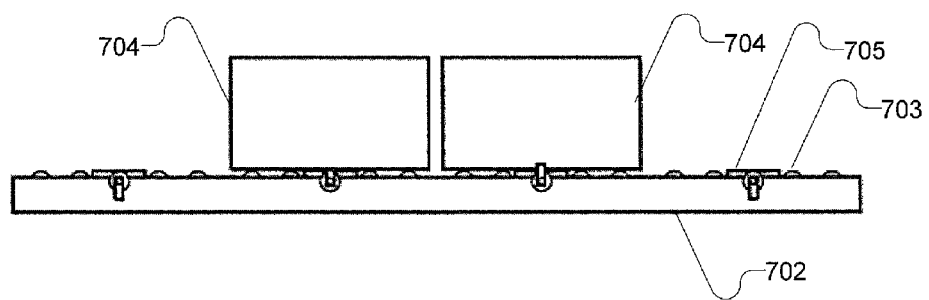
Figure 7C:
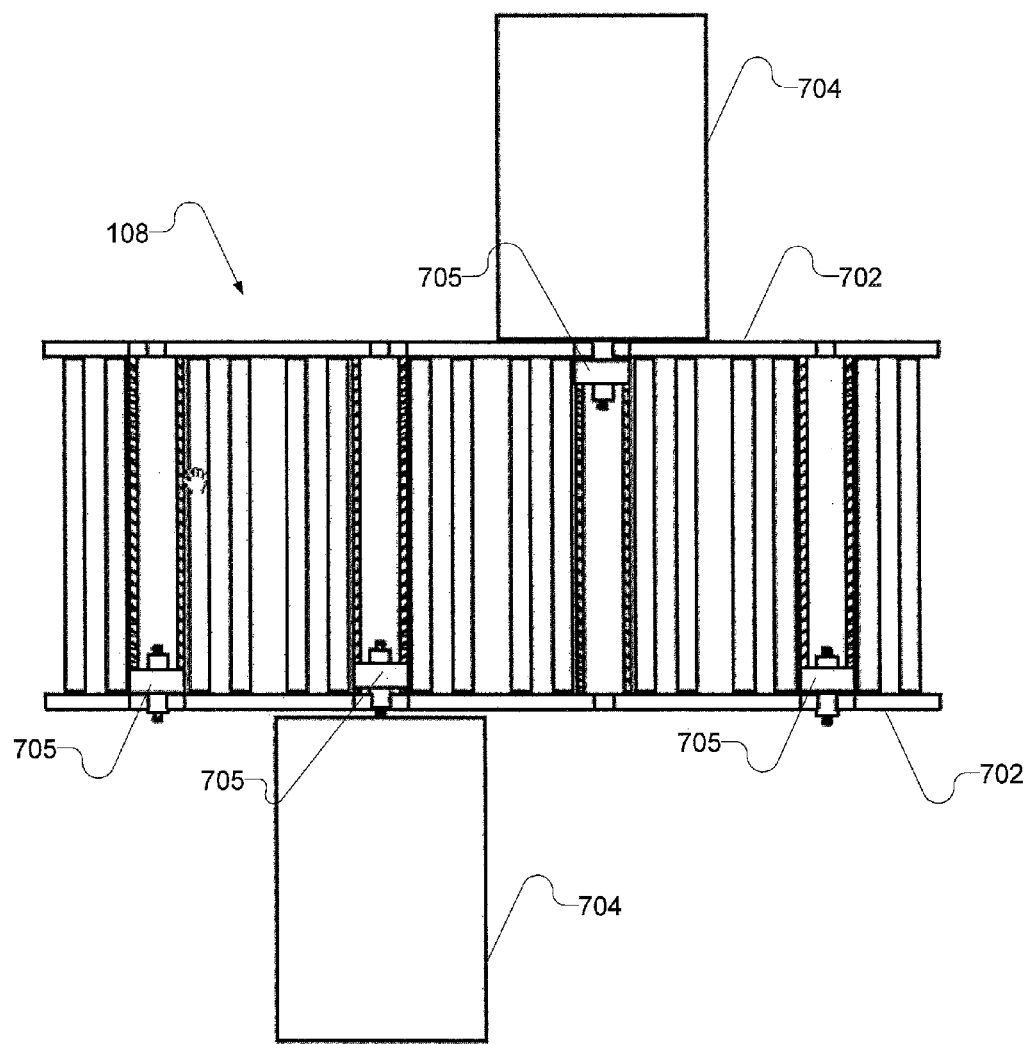

FIG. 7 shows an embodiment of the vertical lift comprising rollers and a movable clutch. FIG. 7a is a perspective view; FIG. 7b is a side view; and FIG. 7c is a top view. The carrier structure 108 (i.e. the vertical lift) comprises lateral elements 702. Transversely disposed rollers 703 performs the sideways shifting or moving of load items 704.

A clutch 705 is embodied as a movable element (also denoted a vehicle) mechanically coupled to parallel spindles 706 disposed parallel to the rollers 703. The clutch is thus configured to travel in the transverse direction by rotation of the spindles 706. The spindles are driven by an electrical motor.

The clutch 705 comprises a shaft (not shown) extending in the transverse direction through the movable element and is configured with cams or rotatable grabbing arms that by rotation can be raised upwardly to engage with a groove, depression or upwardly extending hollow compartment or downwardly extending flange or the like of a load item. When the clutch is engaged with a load item and the movable element moves, driven by the spindles, the load item can be inserted into and withdrawn from the storage rack by pushing or dragging the load item along. Cams or grapping arms are provided at either side of the movable element to enable insertion into or withdrawing from opposing storage racks (cf. FIG. 7c where load items 704 are disposed at opposing sides of the carrier structure 108). The clutch is configured to reach out over the bounds of the carrier structure (which may be defined by its lateral elements) in order reach out to a load item which is to be placed at a certain clearance distance from the carrier structure in the transverse direction.

Figure 8A:
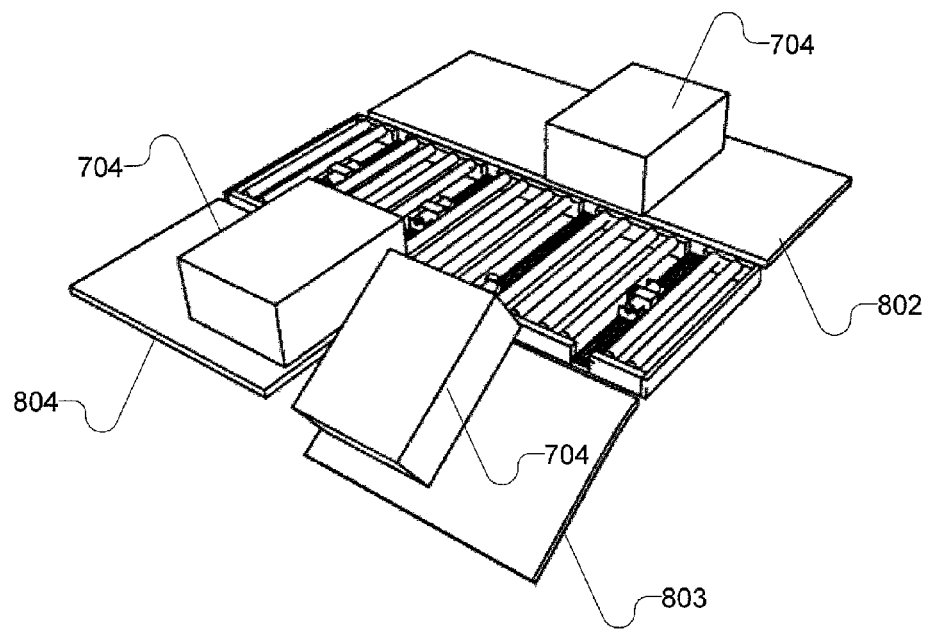
FIG. 8 shows an embodiment of the vertical lift in connection with a load/unload table.
Figure 8B:
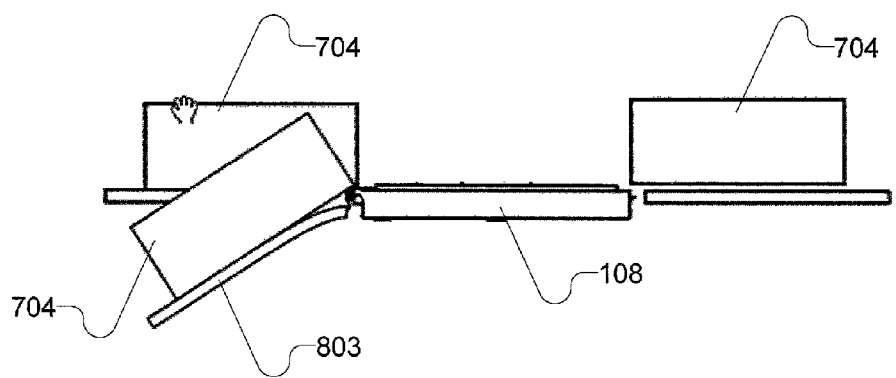

FIG. 8 shows an embodiment of the vertical lift in connection with a load/unload table. FIG. 8a is a perspective view and FIG. 8b is a side view. It is shown that the carrier structure 108 is disposed at the same vertical level as a horizontal flat shelf 802 disposed at a distant side of the carrier structure. Normally, the shelf 802 is arranged as a shelf in a storage rack system with a multitude of shelf stories (or levels). At the nearest side of the carrier structure 108 a downwardly inclined counter 803 is disposed. Next to the counter 803 a horizontal counter 804 or shelf 804 is disposed.

In some embodiments the counter 803 or 804 is configured with means for inclining the desktop downwardly towards the operator to ease his/hers access to the load items and to bring it to a substantial horizontal position, when load items are retrieved there from or placed thereon by the first transportation means. The elevation and/or inclination of the counter can be effectuated by a linear actuator, a cylinder or other means known in the art.

Figure 9:
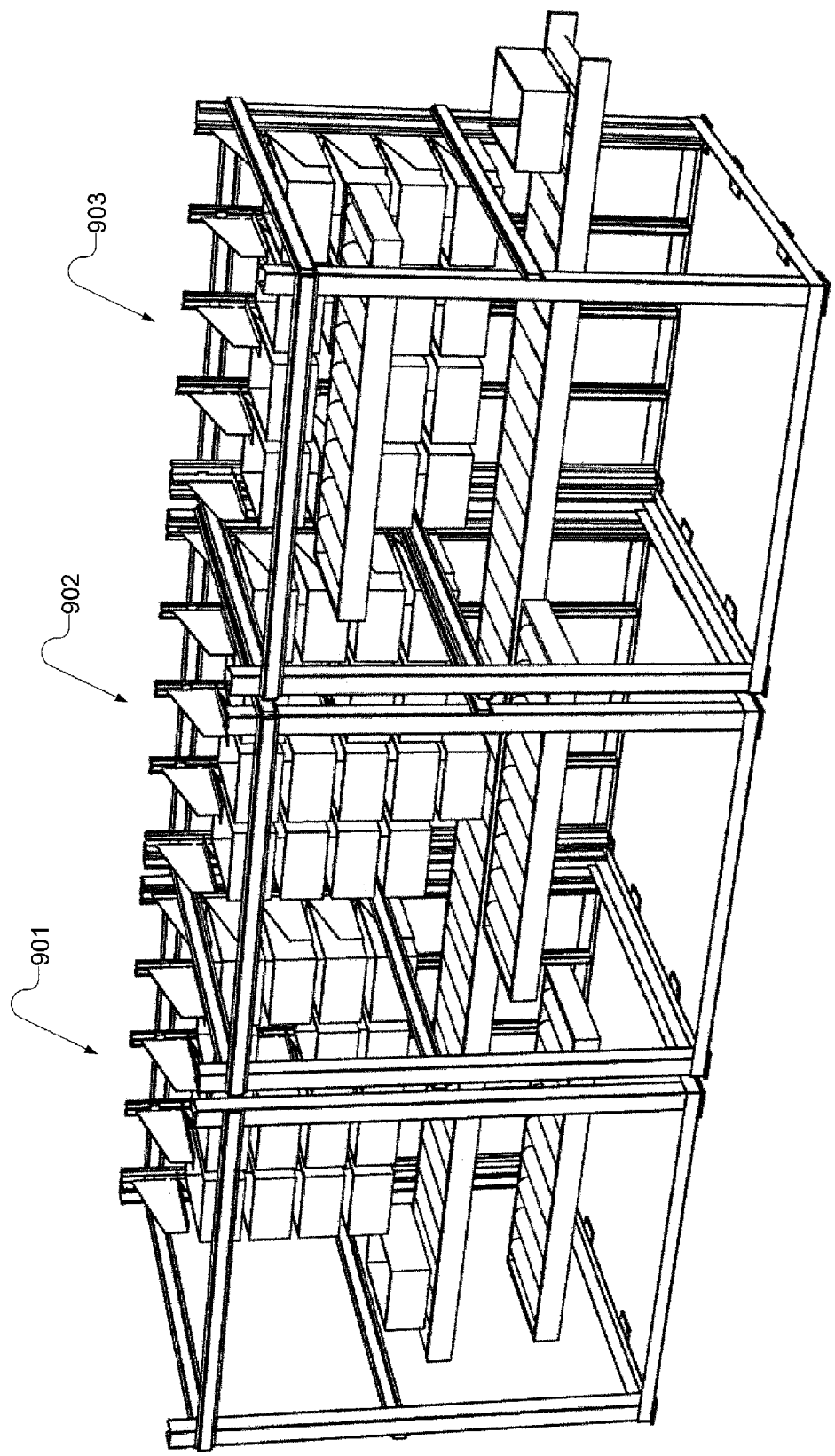
FIG. 9 shows multiple vertical lift storage systems with respective vertical lifts.

FIG. 9 shows multiple vertical lift storage systems with respective vertical lifts. The respective systems 901, 902, 903 are shown as an exemplary configuration of a storage system. The respective systems 901, 902, 903 are arranged in an end-to-end configuration forming a first (distant) side of a storage rack and a second (nearest) side of a storage rack. Each side of the storage rack has three sections. The carrier structures are thereby also arranged end-to-end. Thereby the load items can be conveyed across respective end portions of the carrier structures in a longitudinal direction from one system to another. In some embodiments, a transmission section is disposed as a bridge (transmission section) for moving load items from one respective carrier structure to another.

The load items stored in the respective systems are retrievable by a respective carrier structure (lift). The lift of the system 903 is at its uppermost vertical position where it can access the load items stored at the uppermost level. The lift of the system 902 is at an intermediate vertical position. It can be seen that the load items are stored in a modular structure. The load items are supported by brackets as described in the above.

Figure 10:
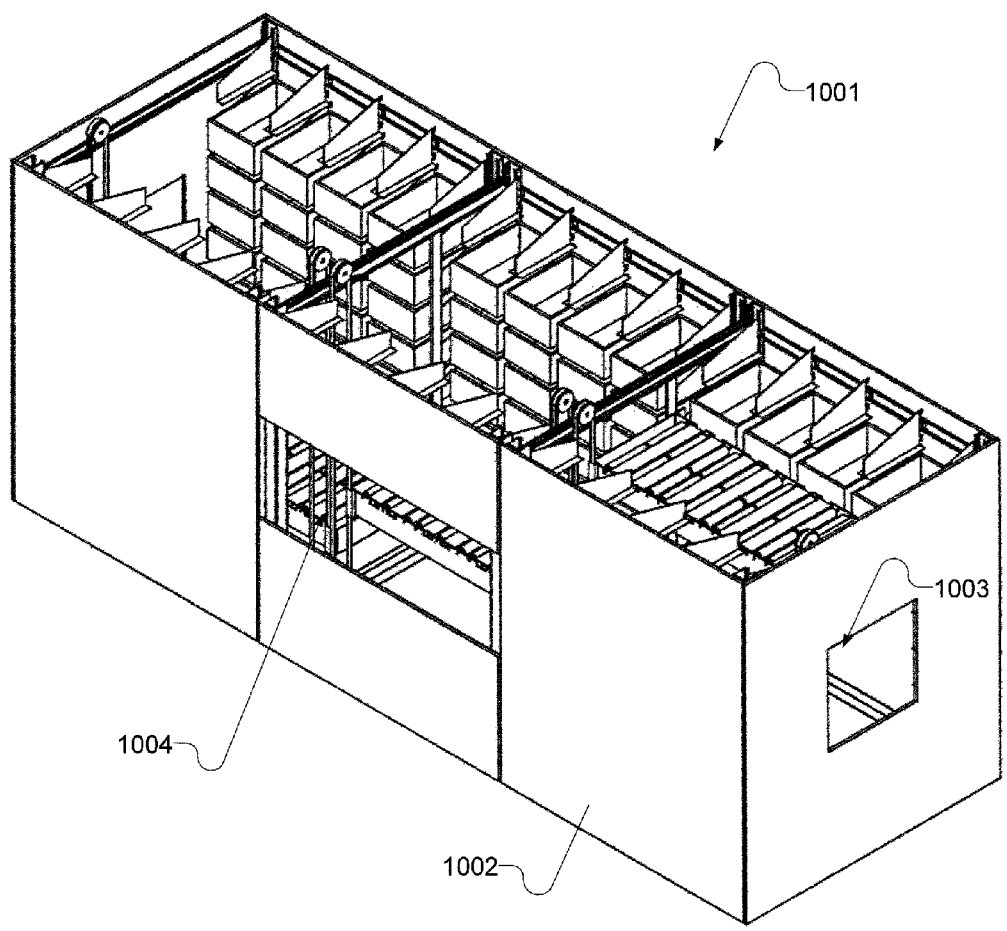
FIG. 10 shows multiple vertical lift storage systems with a cover that has a front opening and a sideways opening.

FIG. 10 shows multiple vertical lift storage systems 1001 with a cover that has a front opening and a sideways opening. The cover 1002 comprises the front opening 1004 (also denoted a first feed opening) and a sideways opening 1003 (also denoted a second feed opening).

Figure 11:
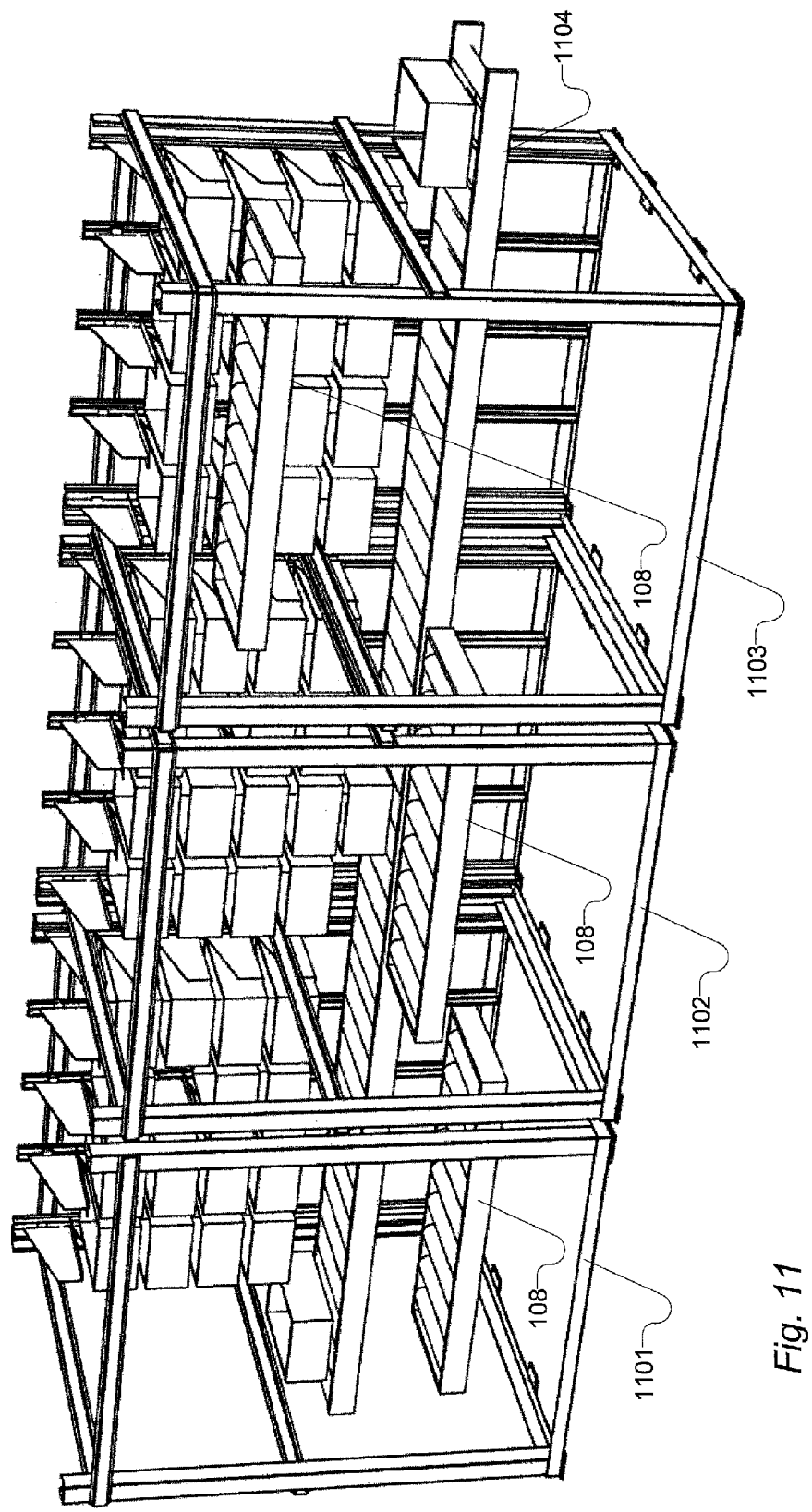
FIG. 11 shows multiple vertical lift storage systems with a horizontal conveyor system.

FIG. 11 shows multiple vertical lift storage systems with a horizontal conveyor system. The respective systems 1101, 1102, 1103 are shown as an exemplary configuration of a storage system. The respective systems 1101, 1102, 1103 are arranged in an end-to-end configuration as described above.

The multiple vertical lift storage systems comprises a conveyor 1104 that extends through the respective systems 1101, 1102, 1103 or rather the storage racks thereof. The conveyor can thereby shift or move load items sideways on the conveyor from one system to another, which may be a neighbouring system or a more distantly disposed system. The conveyor is disposed such that the first transportation means can insert and withdraw load items onto and from the conveyor when the carrier structure is in vertical level with the conveyor i.e. typically within the bounds of a storage rack so as not to interfere with the upwardly and downwardly moving carrier structures (lifts) which are all designated by reference numeral 108. In some embodiments, the conveyor runs along an upwards or downwards extending path.

Generally, the multiple vertical lift storage systems can be arranged in other interconnecting configurations than an end-to-end configuration. For instance the conveyor can run along a curved or straight path outside and between two respective vertical lift storage systems.

Generally, for the sake of clarity, not all components of a working vertical lift storage system are shown.

Figure 12:
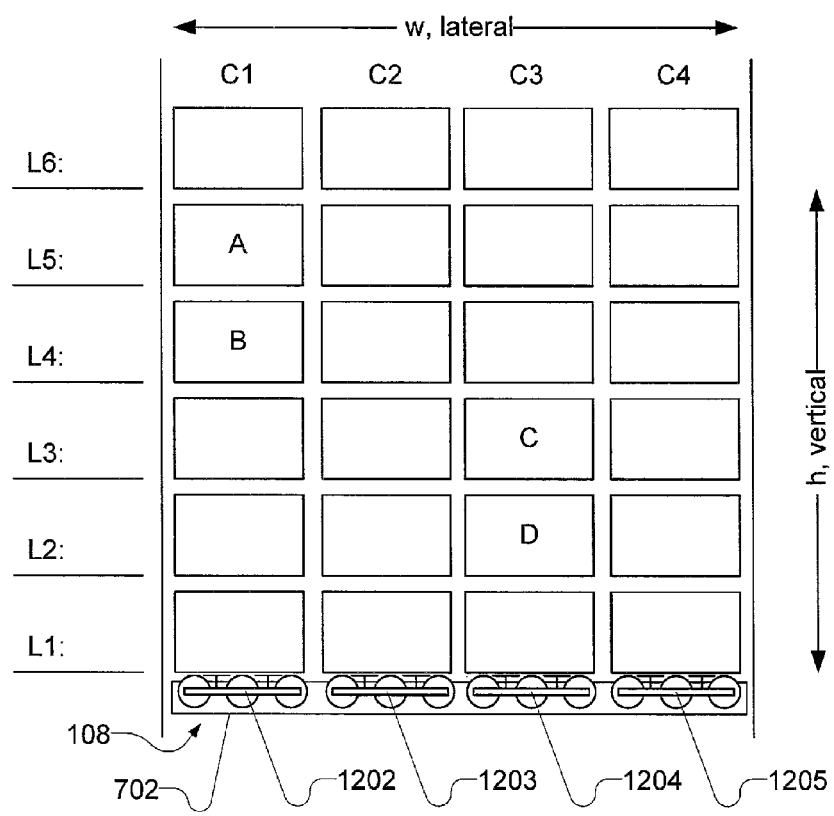
FIG. 12 shows a front view of a storage rack and a carrier structure.

FIG. 12 shows a front view of load units in a storage rack and a carrier structure. The load units are, in this exemplary embodiment, arranged in four columns or stacks: C1, C2, C3 and C4. The four columns, extends over a width w in a lateral direction and has six vertical levels: L1, L2, L3, L4, L5 and L6, extending over the height h in a vertical direction. As shown four of the load units are designated A, B, C and D, where e.g. load unit 'A' is located in the leftmost column, C1, at vertical level L5.

The carrier structure 108 has four sections 1202, 1203, 1204, and 1205 mounted on parallel lateral elements 702. The sections extend laterally to match the width of a column. Also, although not shown in this view, the sections extend in a transverse direction to match the depth of the load units.

Each section 1202, 1203, 1203, 1204, and 1205 of the carrier structure comprises the first and second transportation means. The second transportation means are configured with multiple drive means for driving respective multiple sections individually from one another and/or in synchronism. The first transportation means are configured with multiple drive means for inserting and withdrawing load units from/to respective sections individually from one another and/or in synchronism. This is illustrated further below with reference to FIG. 13 and FIG. 12 in combination.

Figure 13:
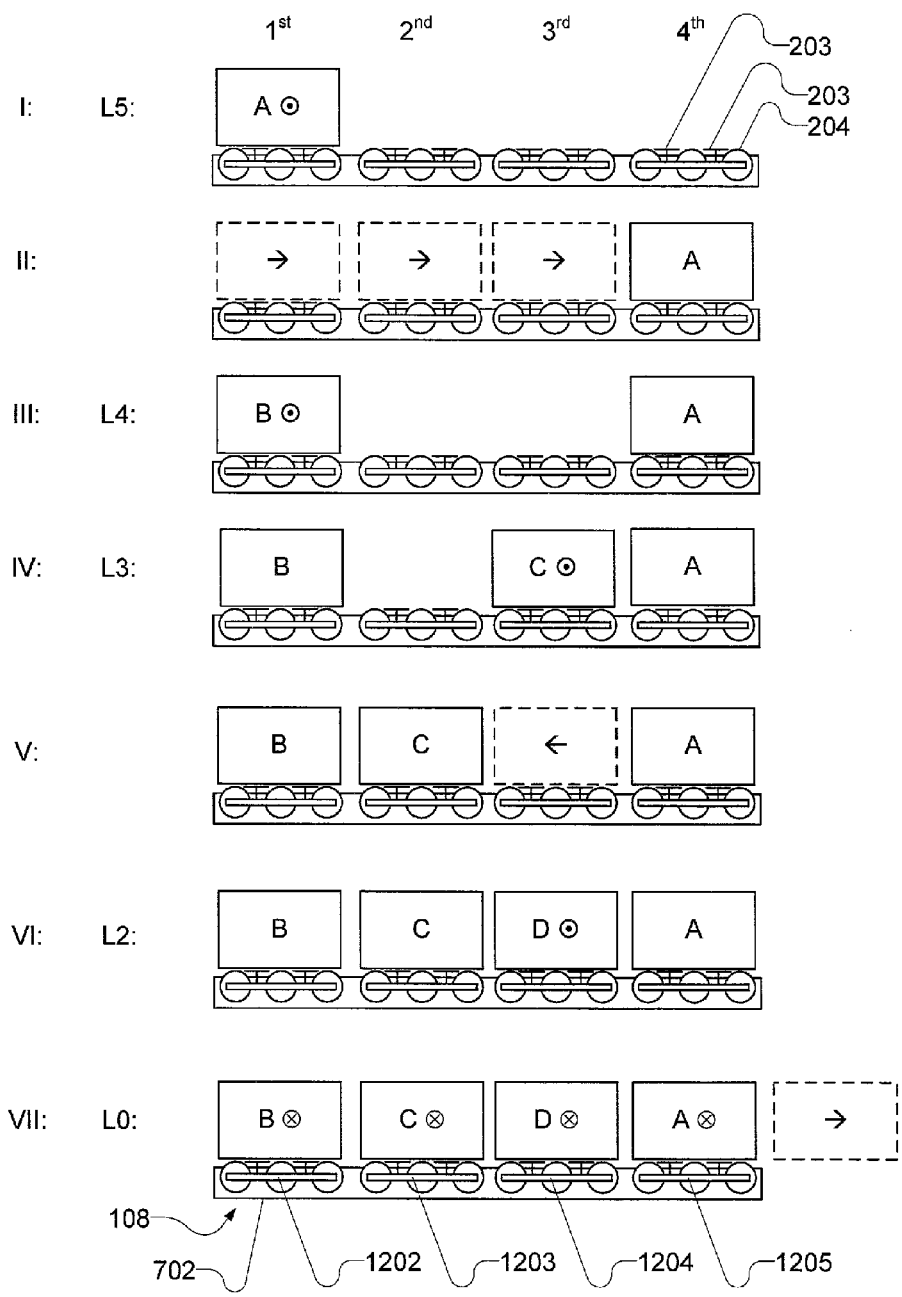
FIG. 13 illustrates in a front-view different loading situations; insert and withdraw operations; and sideways shifting operations.

FIG. 13 illustrates in front-view different, exemplary, loading situations of the carrier structure; insert and withdraw operations; and sideways shifting operations. Generally, symbol '⊙' illustrates a situation where a load unit is withdrawn from a storage rack in front of the carrier structure and onto the carrier structure. A left or right arrow depicted '←' and '→' illustrates a situation where a load unit is shifted sideways to the left or right from one section to another; from one section to a neighbouring section or across one or more sections. Symbol '⊗' illustrates a situation where a load unit is offloaded from the carrier structure and into the storage rack or onto a desk.

The situations are based on retrieving boxes stored as shown in FIG. 12 and based on an allocation strategy where the boxes in the rack are assigned to positions on the lift. The allocation strategy may be based on different strategies e.g. by moving a box the shortest distance on the lift, by distributing weight evenly on the lift, by some position that is selected for further handling of the boxes when they are offloaded from the lift, or any other strategy.

Seven situations are designated by roman numbers I-VII. In a first situation, I, the carrier structure (for short denoted 'lift') is moved to level L5 and the load unit (for short denoted 'box') A is withdrawn from the leftmost column of the storage rack and onto the lift to its corresponding leftmost position ($1^{st}$). In situation II box A is shifted across all sections of the lift to the rightmost position ($4^{th}$). In situation III the lift has been moved to level L4 and box B is withdrawn to the leftmost position ($1^{st}$). Situation II may take place while the lift is at level L5, or while it travels from level L5 to L4, or while it is at level L4 but before box B is withdrawn.

In situation IV the lift has moved to level L3 and box C is withdrawn onto the lift at its $3^{rd}$ position. The box C is then moved left from $3^{rd}$ to $2^{nd}$ position to give room for box D located below in the same column as illustrated in situation V. Thus, box C is moved from one section to a neighbouring section by activating respective sections 3 and 2, while sections 1 and 4 are operated to keep their boxes at stand still. In situation VI box D is withdrawn.

In situation VII the lift has been moved to a level L0 for offloading all boxes (as shown) or for offloading only a selected subgroup thereof. As indicated by symbol '⊗' and the dashed box X, the boxes can be offloaded to a front opening or as indicated by the arrow, the boxes can be offloaded to a side opening. The boxes may be offloaded from the lift and onto a conveyor belt as described in the above.

Figure 14:
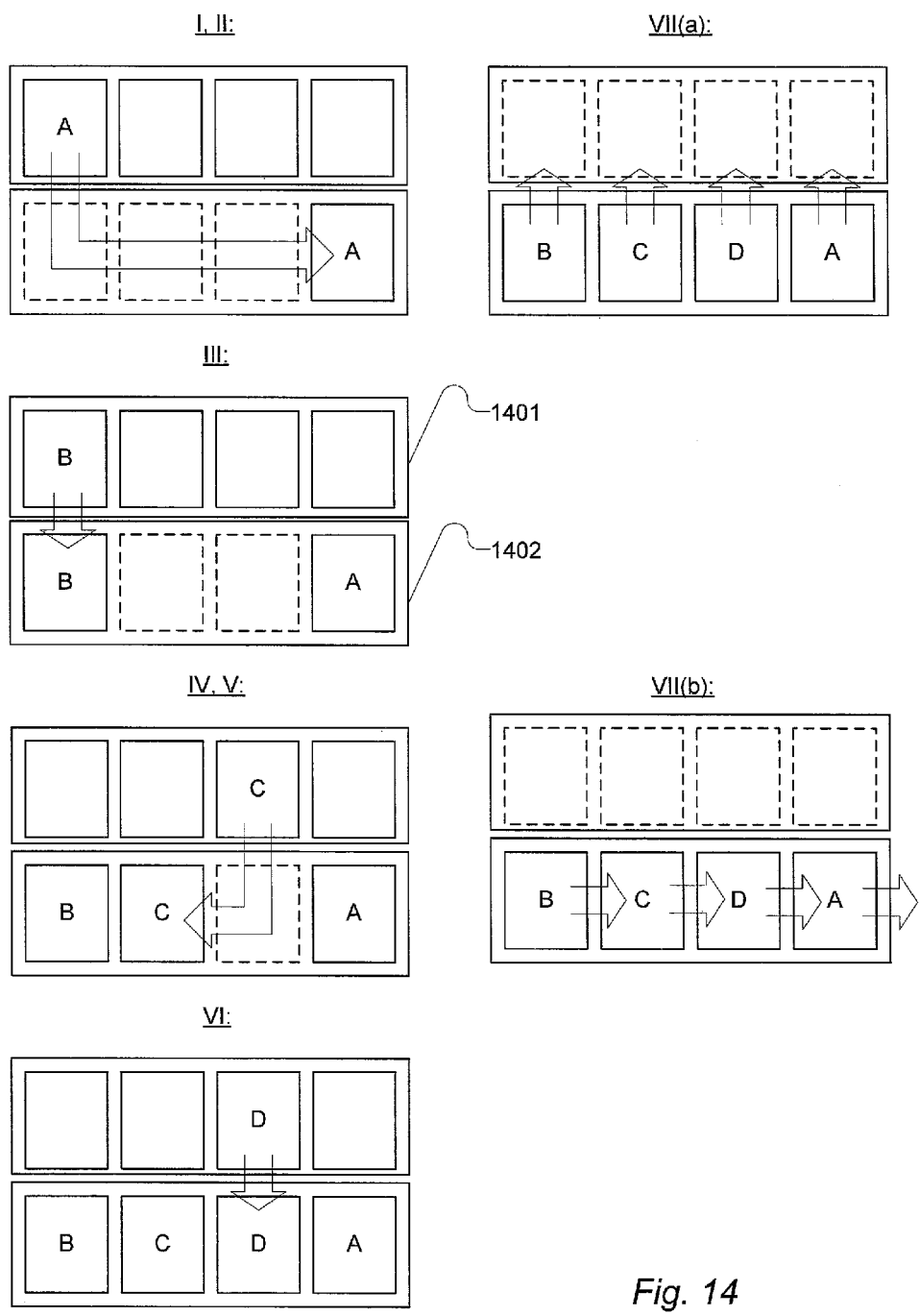
FIG. 14 illustrates in a top-view different loading situations; insert and withdraw operations; and sideways shifting operations.

FIG. 14 illustrates in a top-view different loading situations; insert and withdraw operations; and sideways shifting operations. The situations in FIG. 13 are shown in a top-view, where the lift shaft an area 1402 and the storage rack has an area 1401. In the shown example, the storage rack is located only on a front side of the lift.

In situation VII(a) all boxes or a selected subgroup of them are offloaded in a forward direction; whereas in situation VII(b) the boxes are shifted sideways by operating the drive means of the sections of the lift in synchronism.

Figure 15:
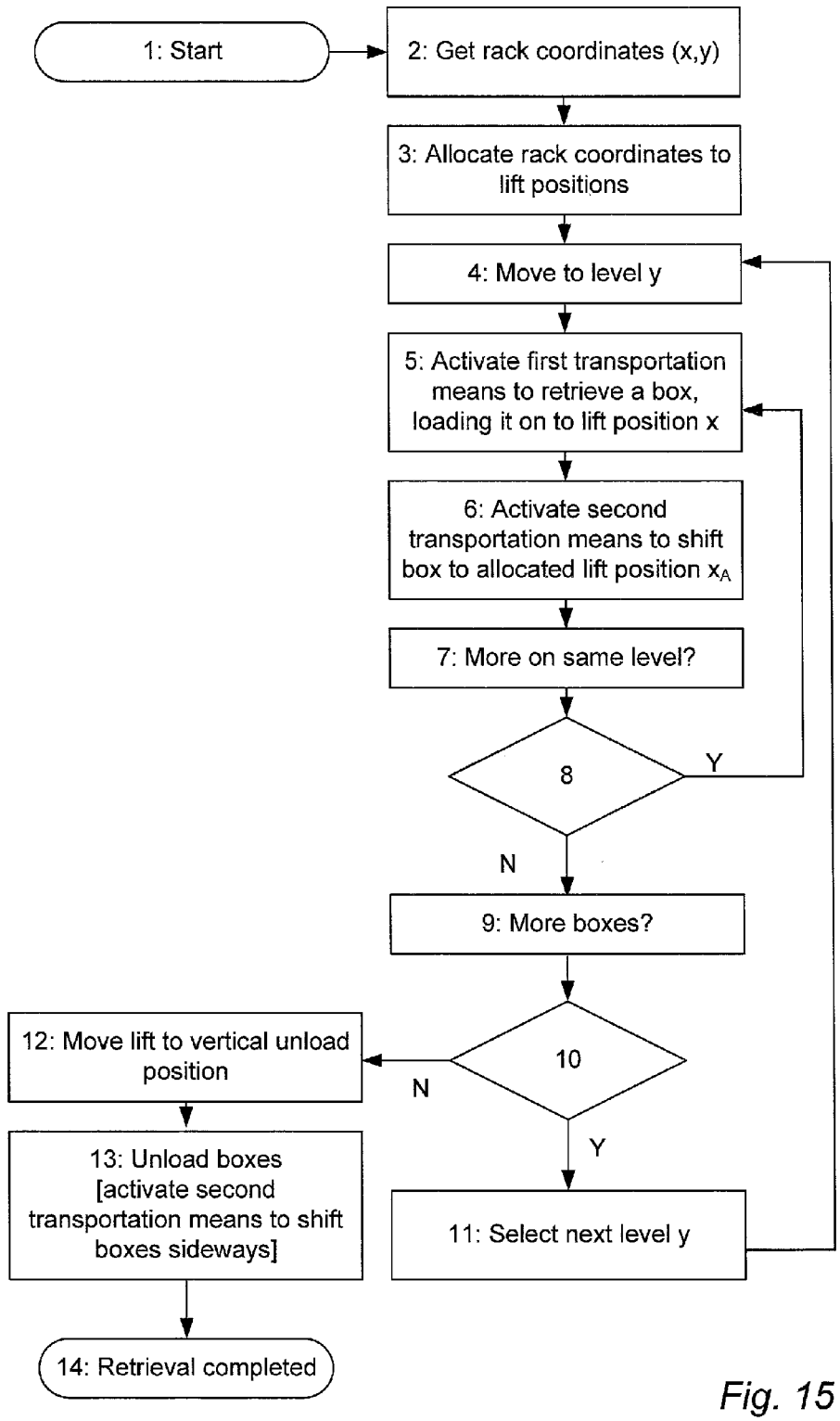
FIG. 15 shows a flowchart for a method of operating a carrier structure in a vertical lift storage system.

FIG. 15 shows a flowchart for a method of operating a carrier structure in a vertical lift storage system. The method starts in step 1 and goes to step 2 to get rack coordinates of the collection of boxes that is included in an order. The coordinates may be manually entered by an operator or retrieved, received or loaded from an order dispatch system. In step 3 the coordinates are processed to allocate rack coordinates to positions on the lift according to a predetermined allocation strategy subject to some type of optimisation. Moreover, a sequence of lift movements, load unit retrievals and sideways shifting thereof is planned. Optionally an offloading sequence is planned. Thus after step 3 the following is known:

- at what positions (coordinates) to retrieve load units or boxes at in a storage rack,
- at what section or position to place them on the lift, and the sequence of movements of the vertical lift and its transportation means.

In step 4 the vertical lift system begins its sequence of movements by moving to a first level (e.g. the topmost level in the sequence). When arrived at the level, a box at coordinates in the sequence is retrieved in step 5 by activating selected first transportation means to retrieve the box and load it onto the lift at its allocated position. In step 7 it is examined whether there are one or more boxes to retrieve at the same level. In the affirmative event (Y), the method continues via step 8 to retrieve an additional box in step 5 as explained above. In the non-affirmative event (N) the method continues to step 9 to examine whether there are more boxes to retrieve in the order (sequence). In the affirmative event (Y), a next level in the sequence is selected in step 11 via step 10 and the method resumes at step 4 to move the lift to that level and continue as described above.

In the non-affirmative event (N), there are no more boxes to retrieve according to the sequence, and the lift is moves in step 12 to a vertical level where the lift can be offloaded (also denoted an unload position). In step 13 the boxes are offloaded either by activation of the first transportation means and/or by means of the second transportation means to provide a sideways offload of the lift. In step 14 the boxes in the sequence are retrieved (retrieval is completed) and the method ends.

It is to be understood that the above description is given to a person skilled in the art who would understand how to incorporate the additional details to make such a system run and work reliably and safely.

The invention claimed is:

1. A vertical lift storage system, comprising:
a storage rack configured to store load units in a plurality of columns; and
a lift system comprising an upwardly and downwardly movable carrier structure that spans substantially a full width of the storage rack, wherein the carrier structure comprises
multiple sections configured to carry multiple load units at respective multiple sections thereof, each section extending across a width of one of the plurality of columns and configured to carry a load unit of the multiple load units,
a first transportation device configured to insert a load unit from one of the sections of the carrier structure into one of the plurality of columns of the storage rack and withdraw a load unit from one of the plurality of columns of the storage rack onto one of the sections of the carrier structure, and a second transportation device for shifting a load unit sideways across the carrier structure from one of the sections to another of the sections while a previously withdrawn load unit being carried on the carrier structure stands still.

2. The vertical lift storage system according to claim 1, wherein the second transportation device is configured with multiple drives for shifting multiple load units sideways across the carrier structure individually from one another and/or in synchronism.

3. The vertical lift storage system according to claim 1, wherein the first transportation device is configured with multiple drives for inserting and withdrawing load units from or to respective sections individually from one another and/or in synchronism.

4. The vertical lift storage system according to claim 1, wherein the first transportation device is configured with drives for raising and lowering load units on respective sections in synchronism relative to the carrier floor.

5. The vertical lift storage system according to claim 1, wherein the first transportation device has a transversely displaceable unit operating in concert with a lift and/or clutch mechanism to perform the inserting and withdrawing of respective load units, and wherein the second transportation device has rollers to perform the shifting of load units sideways on the carrier structure between sections.

6. The vertical lift storage system according to claim 1, wherein the first transportation device comprises:
a support face;
a telescopic arm configured to move the support face in and out; and
a device to lower and raise the support face relative to the carrier structure.

7. The vertical lift storage system according to claim 1,
wherein the carrier structure comprises a first elongated lateral element and a second elongated lateral element; and
wherein the first transportation device is configured with a travelling clutch configured for engaging or disengaging with a load unit and for travelling in a direction transverse to the first elongated lateral element and the second elongated lateral element.

8. The vertical lift storage system according to claim 1, wherein the carrier structure comprises a first elongated lateral element and a second elongated lateral element, wherein the first transportation device and the second transportation device are disposed transverse to the first lateral element and the second lateral element, and wherein a first and a second of the first transportation device are disposed with one or more second transportation devices in between.

9. The vertical lift storage system according to claim 1, comprising multiple self-supporting units with a frame carrying the first transportation device and the second transportation device.

10. The vertical lift storage system according to claim 1,
wherein the first transportation device and the second transportation device are arranged in an array of sections;
wherein the first transportation device of a respective section is in a first mechanical state wherein the first transportation device is engaged with a load unit and a second mechanical state wherein the first transportation device is disengaged from the load unit;
wherein a transition from the first mechanical state to the second mechanical state takes place while the load unit is situated on the respective section; and
wherein the load unit is moved by the first transportation device which is in contact with the second transportation device and the load unit is moved by frictional contact.

11. The vertical lift storage system according to claim 1, each section comprising:
guides that are configured to keep the load unit in place when the load unit is moved in the transverse direction, wherein the guides are controllably raised or lowered.

12. The vertical lift storage system according to claim 1, comprising:
a cover enclosing the vertical lift system configured to shield off the interior of the vertical lift system from undesired interference, said cover comprising a first feed opening extending in the longitudinal direction and a second feed opening in the transverse direction.

13. The vertical lift storage system according to claim 1, wherein the storage rack comprises:

brackets configured with a back fitting and a support structure, wherein the support structure is configured to carry at least one load unit; and
a back wall configured with a support structure or an interconnection device for complementary interconnection with the back fitting for carrying the brackets and the load units stored therein.

14. The vertical lift storage system according to claim 13, wherein the storage rack comprises multiple interior walls and brackets, wherein the interior walls and the brackets are mutually configured such that the brackets are configured to attach to the interior wall in order to provide sideways support for carrying the load units.

15. The vertical lift storage system according to claim 1, wherein the storage rack comprises a conveyor to shift the load units sideways on the conveyor, and wherein the conveyor is disposed such that the first transportation device can insert and withdraw the load units onto and from the conveyor when the carrier structure is in vertical level with the conveyor.

16. A vertical lift storage system comprising:
a storage rack configured to store load units in a plurality of columns; and
a lift system comprising an upwardly and downwardly movable carrier structure that spans substantially a full width of the storage rack, wherein the carrier structure comprises
multiple sections configured to carry multiple load units at respective multiple sections thereof, each section extending across a width of one of the plurality of columns and configured to carry a load unit of the multiple load units,
a first transportation device configured to insert a load unit from one of the sections of the carrier structure into one of the plurality of columns of the storage rack and withdraw a load unit from one of the plurality of columns of the storage rack onto one of the sections of the carrier structure, and a second transportation device for shifting a load unit sideways across the carrier structure from one of the sections to another of the sections;
wherein the first transportation device comprises:
a support face;
a telescopic arm configured to move the support face in and out;
a device to lower and raise the support face relative to the carrier structure; and
a shelf with a recess fitted to the telescopic arm or a lifting device.

17. A vertical lift storage system comprising:
a storage rack configured to store load units in a plurality of columns; and
a lift system comprising an upwardly and downwardly movable carrier structure that spans substantially a full width of the storage rack, wherein the carrier structure comprises
multiple sections configured to carry multiple load units at respective multiple sections thereof, each section extending across a width of one of the plurality of columns and configured to carry a load unit of the multiple load units,
a first transportation device configured to insert a load unit from one of the sections of the carrier structure into one of the plurality of columns of the storage rack and withdraw a load unit from one of the plurality of columns of the storage rack onto one of the sections of the carrier structure, and a second transportation device for shifting a load unit sideways across the carrier structure from one of the sections to another of the sections;
a second storage rack configured to store load units in a plurality of columns;
a second lift system comprising a second upwardly and downwardly movable carrier structure that spans substantially a full width of the second storage rack, wherein the second carrier structure comprises
multiple sections configured to carry multiple load units at respective multiple sections thereof, each section extending across a width of one of the plurality of columns and configured to carry a load unit of the multiple load units,
a first transportation device configured to insert a load unit from one of the sections of the second carrier structure into one of the plurality of columns of the second storage rack and withdraw a load unit from one of the plurality of columns of the second storage rack onto one of the sections of the second carrier structure, and
a second transportation device for shifting a load unit sideways across the second carrier structure from one of the sections to another of the sections; and
a transmission section disposed at a vertical level to convey load units between the carrier structure and the second carrier structure when the carrier structure and the second carrier structure are vertically aligned with the transmission section.

18. A method of operating a vertical lift storage system, wherein the vertical lift storage system comprises:
a storage rack configured to store load units in a plurality of columns, and
a lift system comprising an upwardly and downwardly movable carrier structure that spans substantially a full width of the storage rack, wherein the carrier structure comprises
multiple sections configured to carry multiple load units at respective multiple sections thereof, each section extending across a width of one of the plurality of columns and configured to carry a load unit of the multiple load units,
a first transportation device configured to insert a load unit from one of the sections of the carrier structure into one of the plurality of columns of the storage rack and withdraw a load unit from one of the plurality of columns of the storage rack onto one of the sections of the carrier structure, and a second transportation device for shifting a load unit sideways across the carrier structure from one of the sections to another of the sections while a previously withdrawn load unit being carried on the carrier structure stands still;
the method comprising:
moving the carrier structure to a first vertical level;
activating the first transportation device to withdraw a first load unit from a predetermined column in the storage rack arranged next to the carrier structure and place the first load unit on a respective section of the carrier structure;
activating the second transportation device to shift the first load unit sideways across the carrier structure from the respective section to another section; and
activating the first transportation device a further time to withdraw a second load unit from the predetermined column in the storage rack and place the second load unit on the respective section on the carrier structure.

19. The method according to claim 18, comprising: withdrawing the first load unit from a forward direction in the storage rack and withdrawing the second load unit from a backward position in the storage rack.

20. The method according to claim 18, comprising: moving the carrier structure to a second vertical level, different from the first vertical level, to perform withdrawing of the second load unit from the second vertical level.

21. The method according to claim 18, comprising: activating multiple drives of the second transportation device in synchronism to contemporaneously shift respective load units sideways across the carrier structure.

22. The method according to claim 18, wherein performing the activation of the second transportation device comprises activating a first drive of the second transportation device and a second drive of the second transportation device contemporaneously to shift the first and a second load unit sideways across the carrier structures while a third load unit on the carrier structure remains stationary.

23. The method according to claim 18, comprising: raising a stop element at one side of a destination section such that the stop element remains in a raised position while the load unit is moved sideways, from the opposite side, to that destination section.

24. The method according to claim 18, wherein at least one of the steps is executed by computer loaded with a program for performing the step.

25. The method according to claim 18, wherein at least one of the steps is stored in a non-transitory computer-readable medium encoded with a program for performing the step when run on a computer.

26. A vertical lift storage system, comprising:
a storage rack configured to store load units;
a shelf with a recess fitted to the telescopic arm or a lifting device; and
a lift system with an upwardly and downwardly movable carrier structure,
wherein the carrier structure is configured with a carrier floor for carrying multiple load units at respective multiple sections thereof and with a first transportation device configured to insert and withdraw respective load units into and from the storage rack,
wherein the carrier structure is configured with a second transportation device for shifting load units sideways across the carrier floor between the respective multiple sections; and
wherein the first transportation device comprises:
a support face;
a telescopic arm configured to move the support face in and out, and
a device to lower and raise the support face relative to the carrier structure.

27. A vertical lift storage system, comprising:
a first storage rack configured to store load units in a plurality of columns;
a first lift system comprising an upwardly and downwardly movable first carrier structure that spans substantially a full width of the first storage rack, wherein the first carrier structure comprises
multiple sections configured to carry multiple load units at respective multiple sections thereof, each section extending across a width of one of the plurality of columns and configured to carry a load unit of the multiple load units,
a first transportation device of the first lift system configured to insert a load unit from one of the sections of the first carrier structure into one of the plurality of columns of the storage rack and withdraw a load unit from one of the plurality of columns of the storage rack onto one of the sections of the first carrier structure, and a second transportation device of the first lift system for shifting a load unit sideways across the first carrier structure from one of the sections to another of the sections;
a second storage rack configured to store load units in a plurality of columns;
a second lift system comprising a second upwardly and downwardly movable second carrier structure that spans substantially a full width of the second storage rack, wherein the second carrier structure comprises
multiple sections configured to carry multiple load units at respective multiple sections thereof, each section extending across a width of one of the plurality of columns and configured to carry a load unit of the multiple load units,
a first transportation device of the second lift system configured to insert a load unit from one of the sections of the second carrier structure into one of the plurality of columns of the second storage rack and withdraw a load unit from one of the plurality of columns of the second storage rack onto one of the sections of the second carrier structure, and
a second transportation device of the second lift system for shifting a load unit sideways across the second carrier structure from one of the sections to another of the sections; and
a transmission section disposed at a vertical level to convey load units between the first carrier structure and the second carrier structure when the first carrier structure and the second carrier structure are vertically aligned with the transmission section.

\* \* \* \* \*